(12) United States Patent
Tseng et al.

(10) Patent No.: US 12,027,391 B2
(45) Date of Patent: *Jul. 2, 2024

(54) ELECTROMIGRATION EVALUATION METHODOLOGY WITH CONSIDERATION OF THERMAL AND SIGNAL EFFECTS

(71) Applicant: TAIWAN SEMICONDUCTOR MANUFACTURING COMPANY, LTD., Hsinchu (TW)

(72) Inventors: Hsien Yu Tseng, Hsinchu (TW); Sheng-Feng Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,187

(22) Filed: Apr. 27, 2023

(65) Prior Publication Data

US 2023/0290658 A1 Sep. 14, 2023

Related U.S. Application Data

(60) Continuation of application No. 17/407,876, filed on Aug. 20, 2021, now Pat. No. 11,658,049, which is a
(Continued)

(51) Int. Cl.
*H01L 21/67* (2006.01)
*G06F 30/367* (2020.01)
(Continued)

(52) U.S. Cl.
CPC ...... *H01L 21/67248* (2013.01); *G06F 30/367* (2020.01); *G06F 30/398* (2020.01); *G06F 2119/08* (2020.01)

(58) Field of Classification Search
CPC ............ H01L 21/67248; G06F 30/367; G06F 30/398; G06F 2119/08; G06F 30/39
(Continued)

(56) References Cited

U.S. PATENT DOCUMENTS

| 7,260,442 B2 | 8/2007 | Hwang et al. |
| 7,823,102 B2 | 10/2010 | Chandra et al. |

(Continued)

FOREIGN PATENT DOCUMENTS

| CN | 102136460 | 8/2015 |
| TW | 201218005 | 5/2012 |

OTHER PUBLICATIONS

Office Action dated Dec. 28, 2021 from corresponding application No. TW 11021271730 (pp. 1-5).

*Primary Examiner* — Paul Dinh
(74) *Attorney, Agent, or Firm* — Hauptman Ham, LLP

(57) ABSTRACT

A system for evaluating a heat sensitive structure of an integrated circuit design including a memory for retrieving and storing integrated circuit design layout data, thermal data, process data, and one or more operational parameters, a processor capable of accessing the memory and identifying a target region having a nominal temperature $T_{nom}$, first and second heat generating structures within a first impact range of the target region, calculating the temperature increases $\Delta T_{h1}$ and $\Delta T_{h2}$ in the target region as a result of thermal coupling between the target region and the first and second heat generating structures, and conducting one or more parametric evaluations of the target region at an adjusted evaluation temperature $T_E=T_{nom}+\Delta T_{h1}+\Delta T_{h1}$ after which a network interface transmits the result(s) of the parametric evaluation(s) for use in a design review.

20 Claims, 17 Drawing Sheets

Related U.S. Application Data division of application No. 16/563,799, filed on Sep. 6, 2019, now Pat. No. 11,107,714.

(60) Provisional application No. 62/753,533, filed on Oct. 31, 2018.

(51) Int. Cl.
*G06F 30/398* (2020.01)
*G06F 119/08* (2020.01)

(58) Field of Classification Search
USPC .......................................................... 716/110
See application file for complete search history.

(56) References Cited

U.S. PATENT DOCUMENTS

| | | |
|---|---|---|
| 9,256,709 B2 | 2/2016 | Yu et al. |
| 10,867,109 B2 | 12/2020 | Tseng et al. |
| 2004/0011510 A1 | 1/2004 | Fischer et al. |
| 2013/0227508 A1* | 8/2013 | Gentry .................... G06F 30/23 |
| | | 716/111 |
| 2014/0040838 A1 | 2/2014 | Liu et al. |
| 2015/0278429 A1 | 10/2015 | Chang |
| 2016/0378897 A1 | 12/2016 | Anderson |
| 2019/0147135 A1 | 5/2019 | Chang |
| 2020/0134132 A1 | 4/2020 | Tseng et al. |
| 2021/0264086 A1* | 8/2021 | Lee ........................ G06F 30/367 |

* cited by examiner

ELECTROMIGRATION EVALUATION METHODOLOGY WITH CONSIDERATION OF THERMAL AND SIGNAL EFFECTS

PRIORITY CLAIM

The present application is a continuation of U.S. patent application Ser. No. 17/407,876, filed Aug. 20, 2021, which was a divisional of U.S. patent application Ser. No. 16/653,799, filed Sep. 6, 2019, which claims priority from U.S. Provisional Application No. 62/753,533, filed Oct. 31, 2018, all of which are incorporated herein by reference in their entireties.

BACKGROUND

Current passing through conductive lines induces electromigration (EM), i.e., the movement of the metal atoms resulting from momentum transfer between the electrons passing through the conductive lines and the metal atoms of the conductive lines. Over time, EM causes the formation of hillocks (accumulation of excess metal) and/or voids (depletion of initial metal) in the wire which, in turn, increases the risk of short circuits (hillocks) or open circuits (voids).

A mean time to failure (MTTF) for conductive lines caused by EM is estimated by taking into consideration a number of operative factors including, for example, the sizing(s) of the conductive lines, the composition of the conductive lines, the microstructure of the conductive lines, the current density carried by the conductive lines, the duty cycle(s) over which the current is applied to the conductive lines, the frequency of the signals applied to the conductive lines, and the operating temperature(s) of the conductive lines and adjacent structures. EM evaluation, analysis, and signoff methodologies applied to a particular integrated circuit design attempt to take at least some of the operative factors into consideration in order to provide a reasonable and prudent estimate regarding the lifetime of semiconductor devices manufactured using the integrated circuit design to avoid premature failure of the semiconductor devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
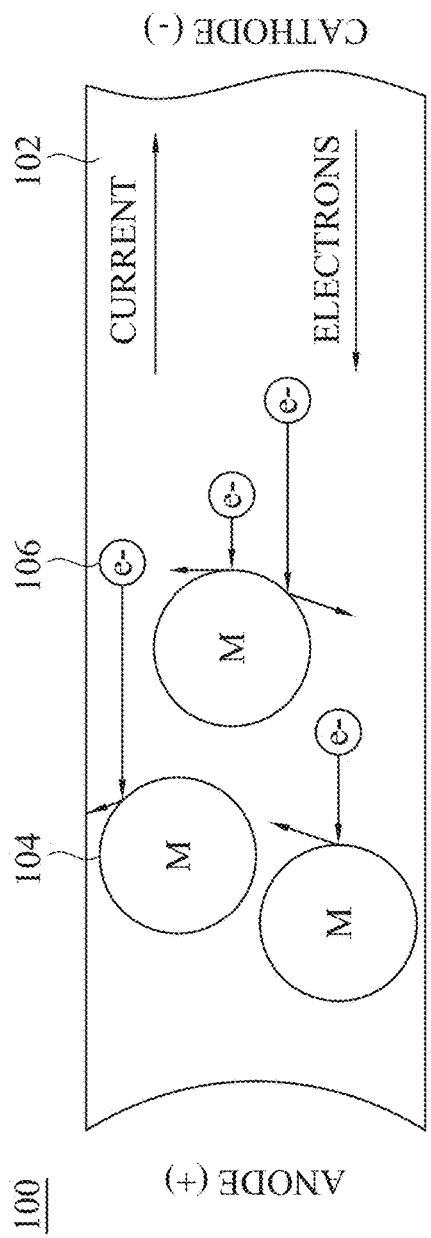
FIG. 1 is a schematic view of a process of electromigration (EM) within a metal wire.

This description of the exemplary embodiments is intended to be read in connection with the accompanying drawings, which are to be considered part of the entire written description. The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus may be otherwise oriented (rotated 90 degrees or at other orientations) and the spatially relative descriptors used herein may likewise be interpreted accordingly.

Semiconductor devices tend to increase in temperature during use as a result of self-heating effects (SHE). The SHE limit both the performance capability and the operational lifetime of the affected semiconductor devices. For example, self-heating effects in semiconductor devices such as fin field effect transistors (FinFETs) will tend to reduce device performance and reliability.

Accordingly, some FinFET integrated circuit designs utilize the conductive lines and interconnecting vias as heat dissipation conduits for controlling the temperature of the active structures. This technique for dissipating heat; however, increases the operating temperature of the conductive lines. The heating from other active elements, when coupled with inherent current/resistance (IR) heating (also referred to as ohmic or joule heating) of conductive lines, increases the risk of accelerated EM-related failures. Device designers seek to address the risk of increased EM resulting from SHE in the conductive lines to some degree by modifying the integrated circuit design and/or operational parameters, but such design compensations tend to reduce the density, reduce the performance, and/or increase the size of the resulting semiconductor device.

FinFET processes and the resulting semiconductor devices tend to provide power, performance, and area (PPA) benefits over planar semiconductor devices. The FinFET integrated circuit designs; however, tend to exhibit greater local current densities which, in turn, lead to greater concern for EM failures in the conductive lines comprising the signal and power rail interconnections within the FinFET semiconductor devices.

In some instances, a FinFET semiconductor device includes a substrate in which is formed an active region (in which a source and drain are formed) and a guard ring. Over the substrate a plurality of conductive line layers separated by layers of interlayer dielectric (ILD) material(s), and vias formed through the ILD materials establish electrical connections to and between the conductive line layers and the substrate elements. Depending on the particular integrated circuit design, heat generated within the active regions of the semiconductor device will reach portions of the conductive line layers that are within the active region impact range and, to some extent, through the vias connecting the conductive lines to the active region.

Because the heat dissipation paths available in FinFET integrated circuit designs are limited by the fin structure, there will be regions and/or structures within the integrated circuit design in which the SHE result in increased operating temperatures that will increase the likelihood of accelerated EM degradation. In some particularly heat sensitive integrated circuit designs, a temperature increase of as little as 10° C. is capable of increasing the EM degradation by 50%. The concerns regarding SHE tend to increase for the reduced structural dimensions associated with more advanced processes and/or high-speed/high-performance integrated circuit designs.

EM occurs when electrical current runs through a conductive line and the electrons transfer a portion of their momentum to the atoms, thereby tending to urge the atoms in the direction of the electron flow. As in FIG. 1, conductive line segment 100 includes a conductive line 102 including a plurality of metal atoms 104, selected from a group of metals including, e.g., aluminum (Al), copper (Cu), titanium (Ti), tantalum (Ta), tungsten (W), platinum (Pt), cobalt (Co) and, in some embodiments, one or more alloying metals or other elements including nickel (Ni), nitrogen (N), and silicon (Si), that have been patterned to form a conductive path for the electrons 106 moving between the cathode and the anode. The repeated transfers of momentum from the electrons 106 to the metal atoms 104 during operation of the semiconductor device will gradually shift the metal atoms from their original positions, thereby increasing the non-uniformity of the conductive line 102.

In those regions of the conductive line in which the movement of the metal atoms 104 reduces the cross-section of the conductive line 102, the current density will increase and further exacerbate both the SHE and EM in the thinned region(s). Conductive lines 102 incorporating such thinned regions will exhibit increased resistance and will typically lead to reduced performance and, eventually, to a void or an open circuit. Conversely, in those regions of the conductive line 102 in which the movement of the metal atoms 104 increases the cross-section of the conductive line 102, the thickened regions, e.g., hillocks, will tend to stress the surrounding materials and eventually compromise the structural integrity of the surrounding materials and/or create short circuit to an adjacent conductive line or other conductor.

To help reduce or eliminate EM-induced failures, the design rules associated with the manufacturing process will include EM rules to limit the average current density through a conductive line and to take into consideration the temperature of the conductive lines during the anticipated operation of the semiconductor device. Integrated circuit designs that pass all of the applicable EM rules are approved for EM signoff and tape-out.

In advanced FinFET processes, the SHE will increase the temperature of the transistor structure by a particular amount $\Delta T$. At least a portion of the SHE that produces the $\Delta T$ will, in turn, be transferred to the conductive lines through direct contact with the transistor and via conduction through intervening materials, e.g., ILD materials/layers. In addition to the SHE associated with the FinFET structure, in some embodiments other high-resistance elements (Hi-R) present on the semiconductor device will also contribute to heating the conductive lines.

EM evaluation methodologies which do not identify and compensate for the increased operating temperature of the conductive lines resulting from or induced by thermal coupling to SHE elements within the semiconductor device have an increased risk of underestimating the conductive line operating temperature. Underestimating the conductive line operating temperature will, in turn, produce an EM evaluation result that is overly optimistic, will tend to overestimate the average lifetime of semiconductor devices manufactured to that design, and result in premature field failures of the affected semiconductor devices.

In order to improve EM evaluation methodologies, the EM evaluation should identify and consider those portions of an integrated circuit design in which SHE are expected to increase the operating temperature of at least a portion of a conductive line.

In some embodiments, a self-heating aware EM evaluation methodology will include using equation-based device temperature calculations; using a pesudo-3D thermal model for estimating the device-to-metal thermal coupling range(s) and effect(s) and generating an adjusted (or nominal) conductive line temperature; and conducting an EM confirmation check at the adjusted metal temperature to compensate for the SHE and improve the accuracy of the EM evaluation.

In some embodiments, in comparison with other EM evaluation methodologies, the self-heating aware EM evaluation methodology will provide more accurate local temperature calculations inside the integrated circuit design; more accurate thermal-aware EM evaluation results during the design phase; a reduced risk of premature product failure; reduced simulation runtime using equation-based device temperature calculations; and reduced EM emulation runtime using pseudo-3D thermal models rather than full 3-D thermal modeling.

Figure 2:
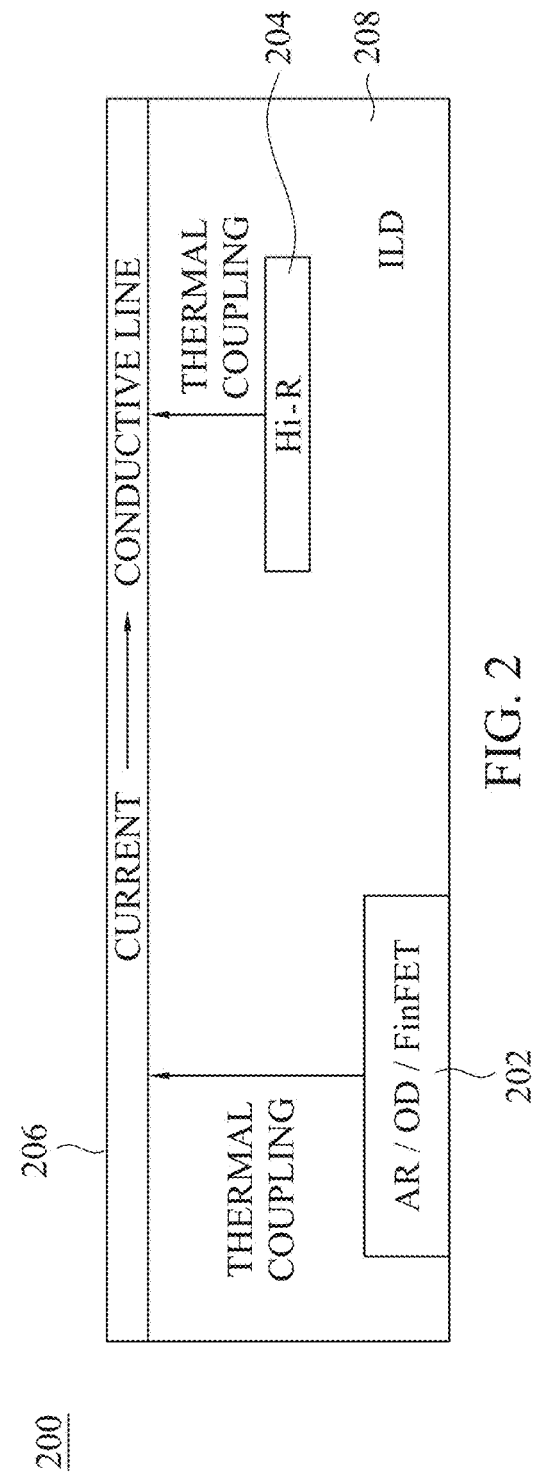
FIG. 2 is a schematic view of thermal coupling between components in accordance with some embodiments.

In some embodiments, the self-heating-aware EM evaluation considers various thermal effects. In embodiments according to FIG. 2, three thermal effects that are considered during the EM evaluation include, FinFET device self-heating; Hi-R device self-heating; and conductive line self-heating. In FIG. 2, a semiconductor structure 200 includes both a FinFET structure 202 and a Hi-R structure 204, both of which are embedded in an ILD structure 208 and which will generate heat during semiconductor device operation. A portion of the heat generated in FinFET structure 202 and Hi-R structure 204 will, in turn, be transferred to conductive line 206 via thermal coupling through the intermediate materials (not shown). In addition to the heat transferred from FinFET structure 202 and Hi-R structure 204, conductive line 206 will also experience some degree of self-heating as a function of the electrical current being transmitted by the conductive line. In some embodiments, the cumulative thermal effects of these three heat sources are then used to calculate an adjusted metal temperature that will be used for the EM evaluation.

Figure 3:
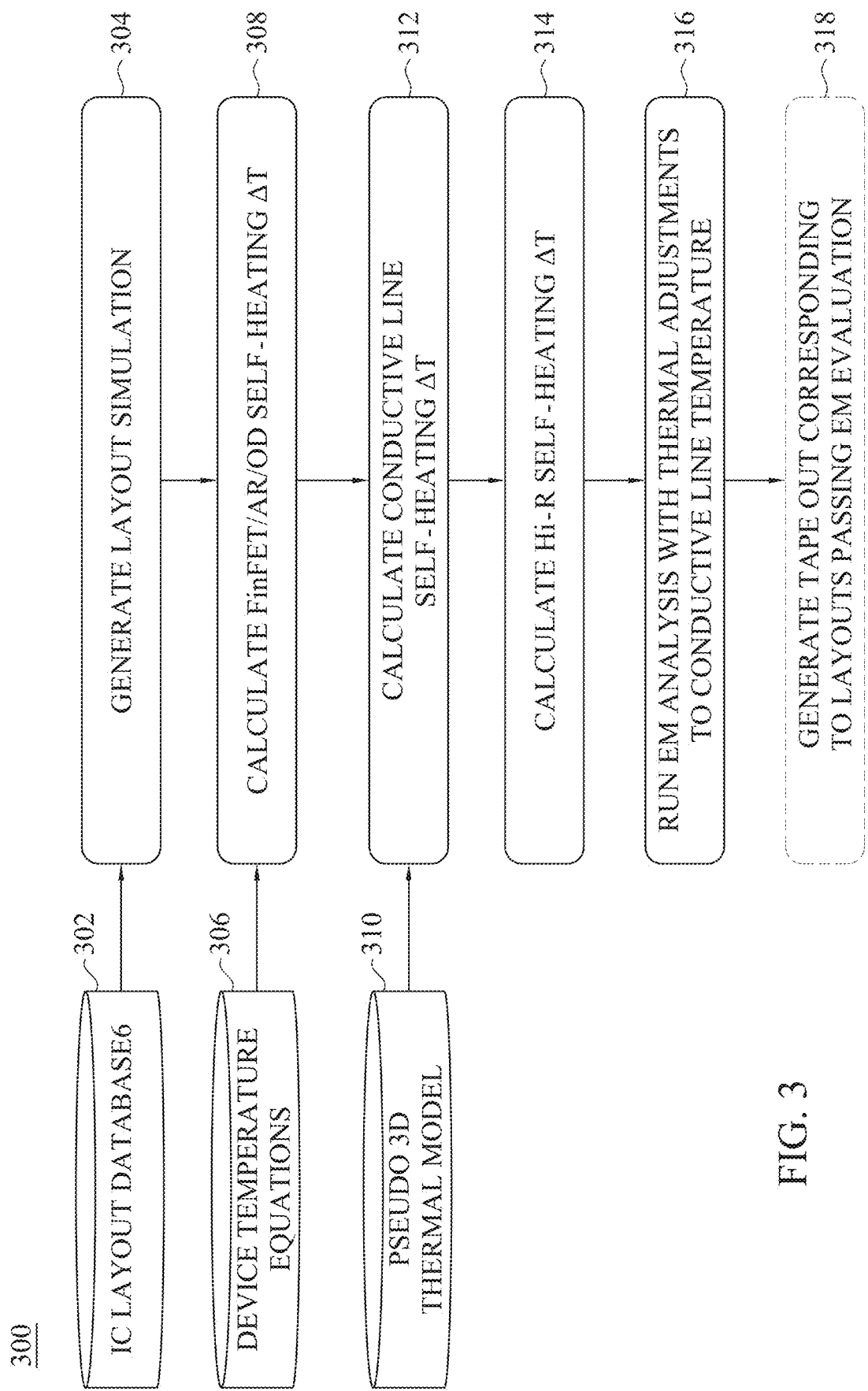
FIG. 3 is a flow diagram of a method of conducting an EM analysis on an integrated circuit layout, in accordance with some embodiments.

In some embodiments according to FIG. 3, EM tool 300 includes a database 302 or other data storage device for storing design data corresponding to an integrated circuit layout, the design data then being used to generate a simulated design layout 304. The simulated design layout 304 is then used in combination with device temperature equations retrieved from a memory 306 to calculate 308 an anticipated increase in temperature $\Delta T$ for at least a portion of the heat generating devices identified in the simulated design layout, e.g., FinFET and Hi-R structures.

In some embodiments, the $\Delta T$ for FinFET structures is calculated using the device temperature equation Eq. 1:

$$\Delta T = R_{THC} \times \text{finger\_effect} \times \text{fin\_effect} \times \text{Power}_{per\_fin\_per\_finger} \qquad \text{[Eq. 1]}$$

In some embodiments, the relevant values and/or parameters included in the device temperature equation are provided by the foundry, incorporated in the applicable design rules, or extracted from the integrated circuit layout and include:
- $R_{THC}$: thermal resistance value (typically provided by foundry)
- fin number: determined from integrated circuit layout
- finger number: determined from integrated circuit layout
- power per fin per finger (watt) (typically provided by foundry)
- finger-effect=finger number
- fin-effect=fin number In some embodiments, the device temperature equation is provided as part of the design tools provided by a semiconductor device foundry including, for example, a Simulation Program with Integrated Circuit Emphasis (SPICE) model corresponding to a particular manufacturing process.

Using a pseudo-3-D thermal model retrieved from memory 310, the EM tool 300 then calculates the anticipated increase in temperature $\Delta T$ for both conductive lines 312 and Hi-R structures 314 identified in the integrated circuit layout as a result of self-heating. The EM tool 300 then uses the $\Delta T$ data for the heat sensitive structures and proximate heat generating structures to calculate an adjusted operating temperature $T_E$ for the temperature sensitive structures, e.g., conductive lines, during operation of a semiconductor device according to the integrated circuit layout.

In some embodiments, the pseudo-3-D thermal model will incorporate a number of coefficients, e.g., a, b, c, d, that will be specific to each of the materials and/or layers incorporated in the integrated circuit design under analysis and to the particular manufacturing process that will be used to produce semiconductor devices according to the integrated circuit design. In some embodiments, the $\Delta T$ for a heat sensitive structure, e.g., a conductive line, will be a function of both self-heating of the heat sensitive structure and the thermal contribution(s) from other heat generating structures proximate the heat sensitive structure. In some embodiments, the $\Delta T$ for a conductive line, for example, will be calculated according to Eq. 2 provided below:

$$\Delta T_{Con} = \Delta T_{nms} + f(a, b, \Delta T_{ch}, c, d, \Delta T_{Hi\text{-}R}, \Delta T_{other\_devices}, \ldots) \qquad \text{[Eq. 2]}$$

In some embodiments, the relevant values and/or parameters included in the $\Delta T_{Metal}$ equation are provided by the foundry, incorporated in the applicable design rules, or extracted from the integrated circuit layout and include:
- $\Delta T_{nms}$: current-induced metal heating
- $\Delta T_{ch}$: FinFET device self-heating
- $\Delta T_{Hi\text{-}R}$: device self-heating
- $\Delta T_{other\_devices}$: Device self-heating from other devices other devices For the purposes of the $\Delta T_{con}$ calculation according to Eq. 2, other devices will include, for example, bipolar junction transistors (BJT), diodes, and resistors that are thermally coupled to the conductive line under analysis.

The thermal coefficients a, b, c, and d are provided for each layer and/or material and reflect:
- a=a derating coefficient (or de-rating coefficient) value reflecting operation at less than maximum capacity
- b=a function of $\Delta T_{nms}$ and $\Delta T_{ch}[f(\Delta T_{nms}, \Delta T_{ch})]$
- c=a layer effect associated with the layer/material
- d=a temperature profile associated with the layer/material EM tool 300 then performs an EM analysis 316 using the adjusted $T_E$ for the heat sensitive structures, e.g., conductive lines, to provide a more accurate analysis of the anticipated performance of the semiconductor device. In some embodiments, the EM tool will generate a tape out data file 318 corresponding to an integrated circuit layout that passes the EM analysis.

Figure 4:
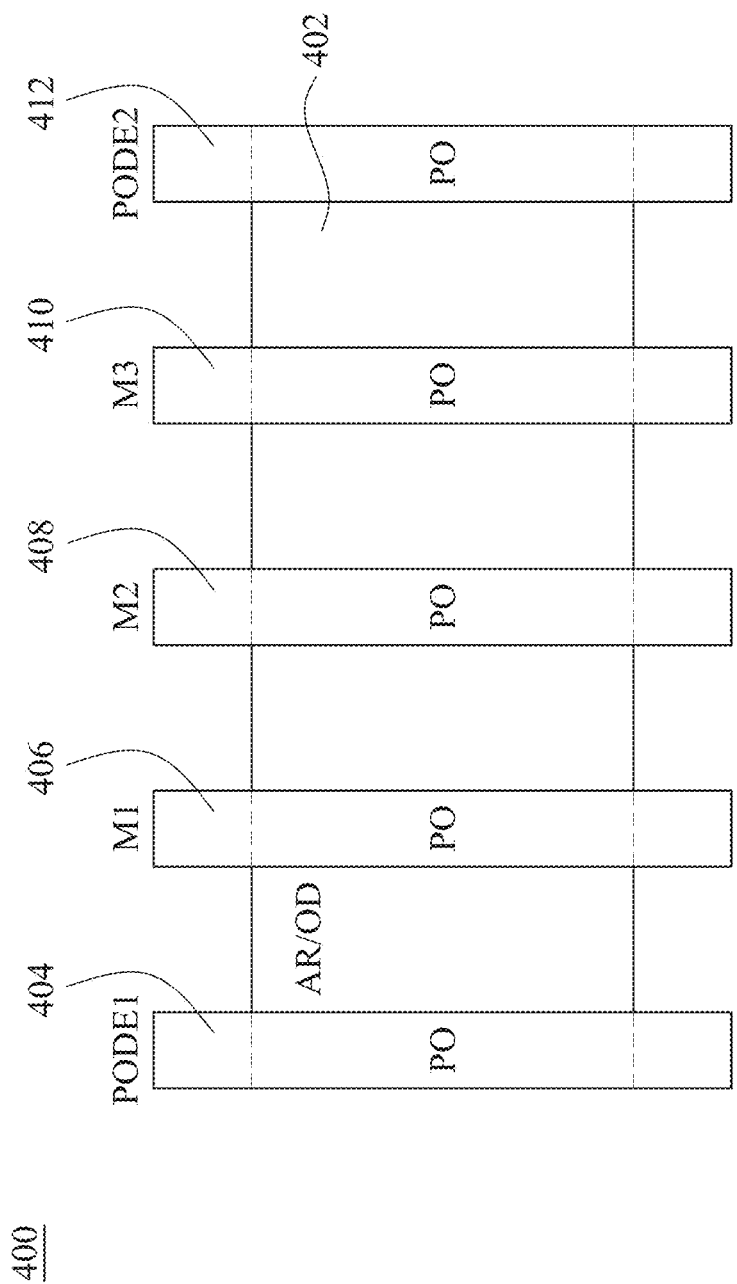
FIG. 4 is a top view of an active region of an integrated circuit layout in accordance with some embodiments.

In some embodiments, calculating the $\Delta T_{AR}$ for an active region is a function of the individual $\Delta T$ calculations for each of the structures incorporated within the particular active region. In some embodiments according to FIG. 4, for example, the $\Delta T_{AR}$ for active region active region structure 400 will be a function of $\Delta T$ calculations for a first polysilicon over diffusion edge (PODE) structure 404, a first conductor M1 406, a second conductor M2 408, a third conductor M3 410, and a second PODE structure 412 that are formed over a diffused region 402. This function is represented by Eq. 3 as presented below.

$$\Delta T_{OD} = f(\Delta T_{PODE1}, \Delta T_{M1}, \Delta T_{M2}, \Delta T_{M3}, \Delta T_{PODE2}) \qquad \text{[Eq. 3]}$$

In some embodiments, this cumulative $\Delta T_{OD}$ will then be used in subsequent calculations for evaluating the magnitude of thermal coupling between this active region and proximate heat sensitive structures, e.g., conductive lines.

In some embodiments, the range over which thermal coupling is expected to occur between a heat generating structure and the heat sensitive structure, i.e., the impact range or thermal coupling range, is defined by a horizontal distance, i.e., the impact range or thermal coupling range, from the associated heat generating structure. In some embodiments according to FIG. 5A, a semiconductor device 500 includes a number of heat sensitive structures, e.g., conductive layers including, e.g., conductive line Ma 504, conductive line Mb 506, conductive line Mc 508, and conductive line Md 510, as well as two heat generating structures, i.e., active region 502 and Hi-R structure 512, arranged within dielectric and/or semiconducting material(s) 518. With respect to the structure 512, the Hi-R impact range 514 is set at A μm, while for the active region 502, the active region impact range 516 is set at B μm. The Hi-R and active region impact ranges are then projected vertically through the structure 500 to define both a Hi-R impact area 520, an active region impact area 522, and a combined impact area 524 in which the effects of both the Hi-R and active region impacts will affect structures located therein.

The $\Delta T_{Con}$ calculations for the heat sensitive structures according to Eq. 3 include a contribution based on the location of the conductive lines 504, 506, 508, 510 with respect to the Hi-R impact area and an active region impact area. In some embodiments according to FIG. 5A for example, the $\Delta T_{Con}$ for conductive line 504 will include thermal contributions from both the active region impact area and the Hi-R impact area, the $\Delta T_{Con}$ for conductive line 506 will not include a thermal contribution from either the active region impact area or the Hi-R impact area, the $\Delta T_{Con}$ for conductive line 508 will include a thermal contribution from only the active region impact area, and conductive line 510 will include a thermal contribution from only the Hi-R impact area.

In some embodiments, the range over which thermal coupling is expected to occur between a heat generating structure and the heat sensitive structure, i.e., the impact range, is defined by a distance extending from the associated heat generating structure. In some embodiments according to FIG. 5B, a semiconductor device 500 includes a number of heat sensitive structures, i.e., conductive line Ma 504, conductive line Mb 506, conductive line Mc 508, and conductive line Md 510, as well as two heat generating structures, i.e., active region 502 and Hi-R structure 512, arranged within dielectric and/or semiconducting material(s) 518. With respect to the structure 512, the Hi-R impact range 514 is set at A μm, while for the active region 502, the active region impact range 516 is set at B μm. The Hi-R and active region impact ranges are then rotated through the structure 500 to define both a Hi-R impact area and an active region impact area.

The $\Delta T_{Con}$ calculations for the heat sensitive structures according to Eq. 3 include a contribution based on the location of the conductive lines 504, 506, 508, 510 with respect to the Hi-R impact area and an active region impact area. In embodiments according to FIG. 5B for example, the $\Delta T_{Con}$ for conductive line 504 includes thermal contributions from both the active region impact area and the Hi-R impact area, the $\Delta T_{Con}$ for conductive line 506 does not include a thermal contribution from either the active region impact area or the Hi-R impact area, the $\Delta T_{Con}$ for conductive line 508 does not include a thermal contribution from either the active region impact area or the Hi-R impact area, and conductive line 510 includes a thermal contribution from only the Hi-R impact area.

Figure 5A:
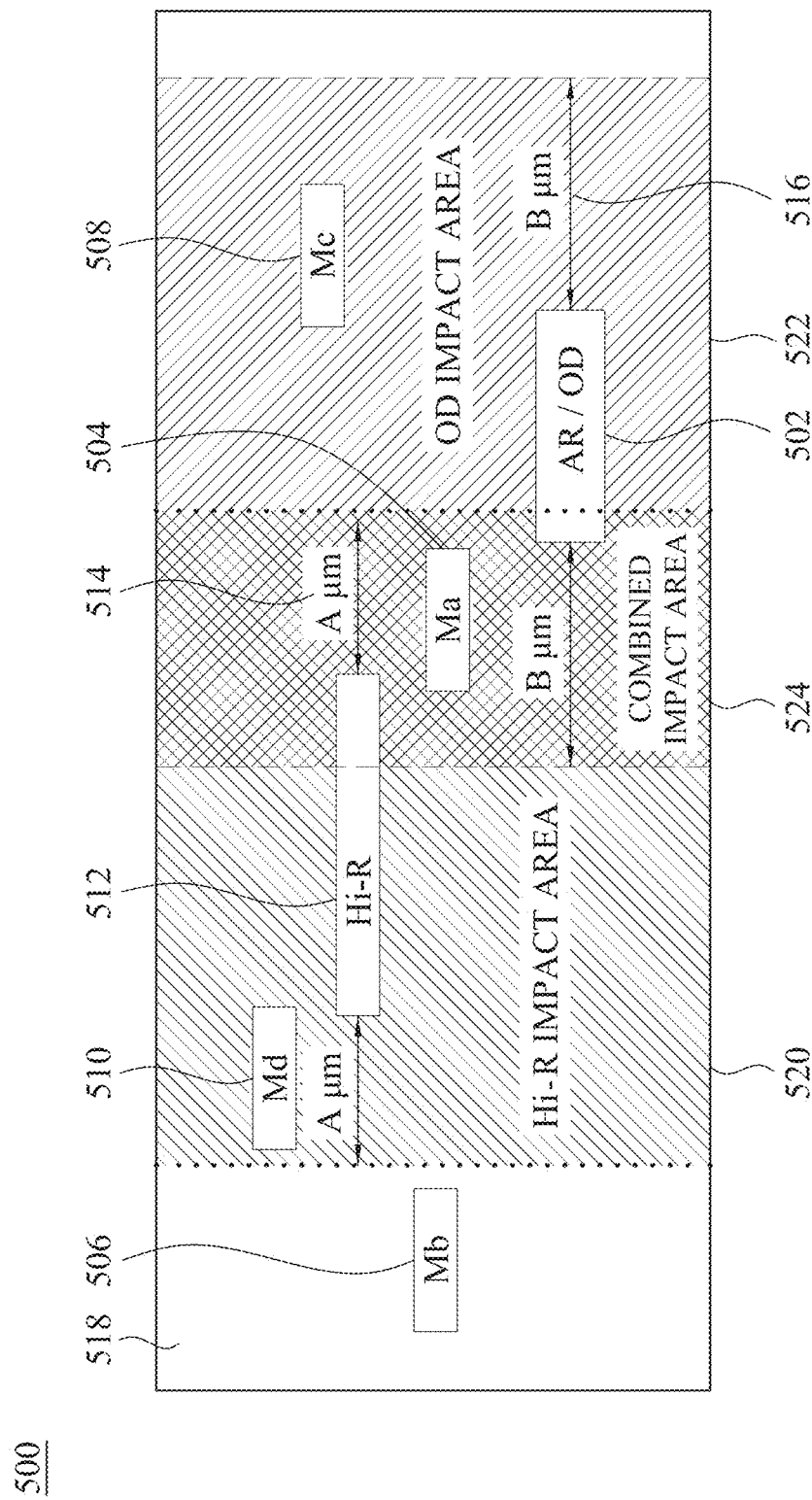
FIGS. 5A-5B are cross-sectional views showing thermal effects among components of an integrated circuit layout in accordance with some embodiments.
Figure 5B:
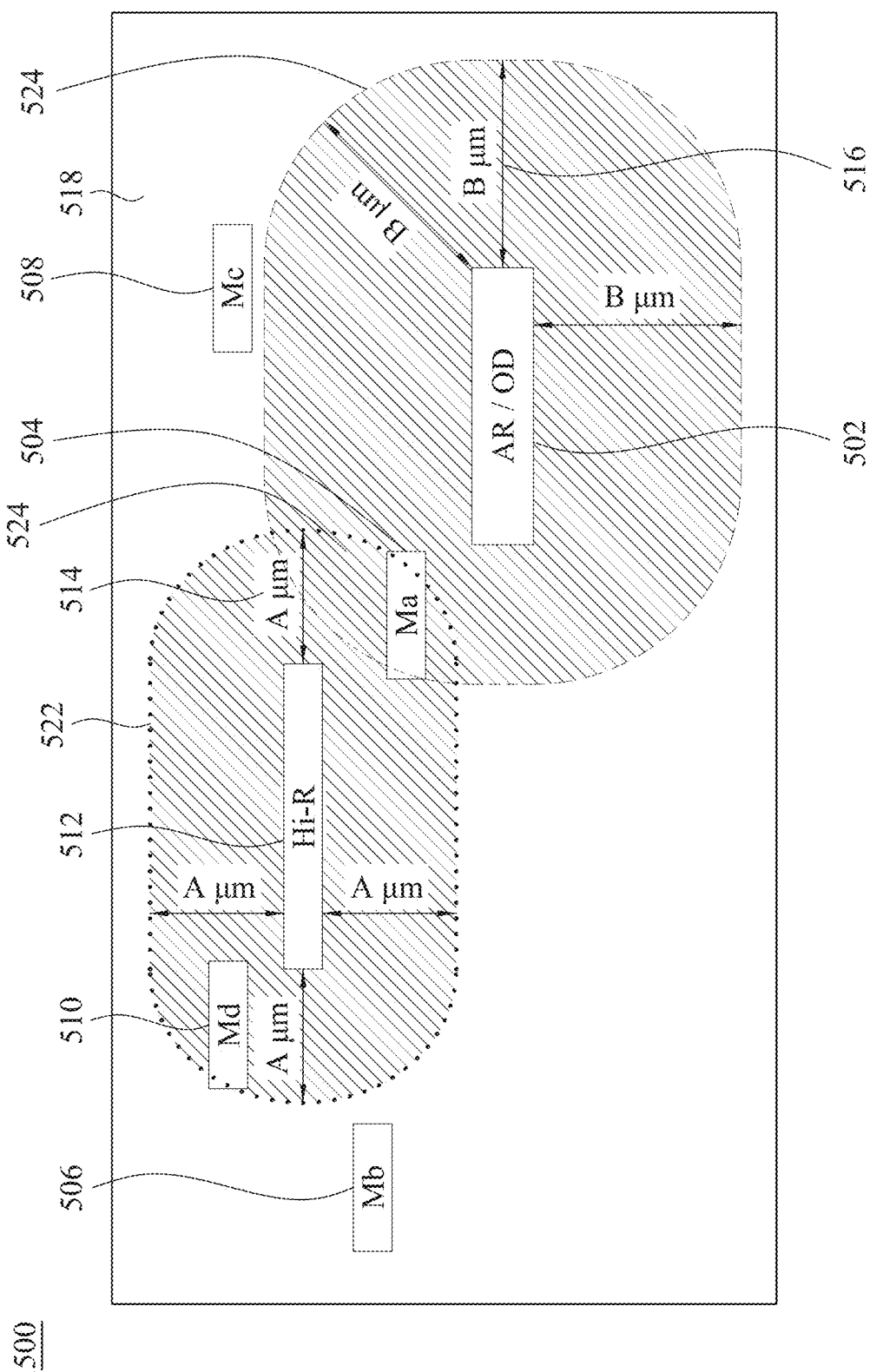

In some embodiments according to FIG. 5A and/or FIG. 5B, the impact areas associated with two or more heat generating structures overlap, at least in part, to define a combined impact area 524.

Figure 6A:
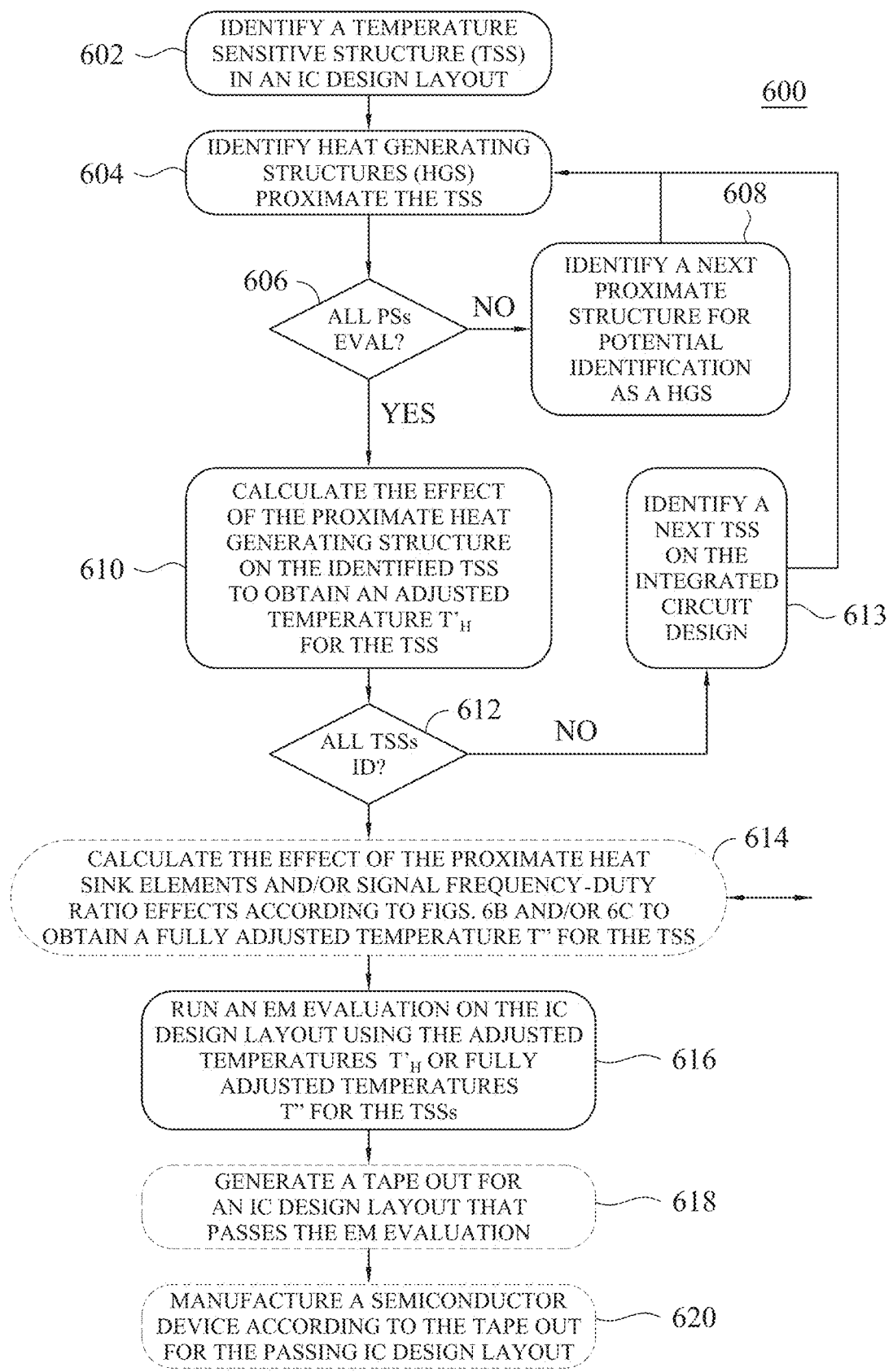
FIGS. 6A-6C are flow diagrams of a method for adjusting an EM analysis on an integrated circuit layout to compensate for thermal and signal effects in accordance with some embodiments.

FIG. 6A is a flowchart of a method 600 for improving the accuracy of EM evaluations conducted in connection with integrated circuit design by taking into account the degrading effects of increasing temperatures resulting from heat generating structures, i.e., structures that are projected to have an operating temperature above that of temperature sensitive structures that are situated within a heating impact area (an area over which thermal coupling is known or expected) that is associated with a particular heat generating structure. Evaluating the SHE of heat generating structures will, in some embodiments, suggest that the performance and/or lifetime of the heat sensitive structures will be degraded as a result of the proximity and operating temperature of the heat generating structure(s). By recognizing and compensating for the additional heat emanating from the heat generating structures, the EM evaluation according to some embodiments will provide a more pessimistic or more accurate estimate of the anticipated performance of the semiconductor device, thereby increasing the likelihood that the semiconductor devices will meet or exceed customer expectations.

In some embodiments of methods according to FIG. 6A, in operation 602, one or more temperature sensitive structures (TSS), e.g., transistors, conductive lines, and other structures for which an increased operating temperature will degrade performance and/or lifetime, are identified during a structural and/or operational review of an integrated circuit design layout that is under evaluation. In operation 604, proximate structures, e.g., surrounding and/or adjacent the temperature sensitive structure are evaluated for identification as heat generating structures (HGS). In order to be identified as a heat generating structure, i.e., a proximate structure will exhibit at least the properties of 1) an operating temperature that meets or exceeds a predetermined temperature level above the anticipated operating temperature of the temperature sensitive structure and 2) a location within the impact area defined by the temperature sensitive structure (or by the heat generating structure) that allows for thermal coupling between the heat generating structure and the temperature sensitive structure. Proximate structures having or exhibiting an operating temperature and location sufficient to meet the noted properties are then identified as heat generating structures.

Operation 606 involves a query regarding the extent to which the proximate structure(s) (PSs) has/have been successfully evaluated for potential identification as a heat generating structure. If fewer than all of the proximate structures have been evaluated, method 600 branches from operation 606 to operation 608 in order to identify the next proximate structure for evaluation as a heat generating structure and return to operation 604 for evaluation of the next proximate structure. When all of the proximate structures have been evaluated for possible identification as heat generating structures, method 600 branches to operation 610 for calculating the ΔT contribution to the operating temperature of the temperature sensitive structure from each of the identified heat generating structures.

Operation 612 involves a query regarding the extent to which the temperature sensitive structures (TSSs) within the integrated circuit design have been successfully evaluated for potential identification as a heat generating structure. If fewer than all of the temperature sensitive structures on the integrated circuit design have been identified, method 600 operation branches from operation 612 to operation 613. During operation 613, the next temperature sensitive structure is identified on the integrated circuit design. The identification in operation 613 is then returned to operation 604 for identification of heat generating structures proximate the next temperature sensitive structure.

Figure 6B:
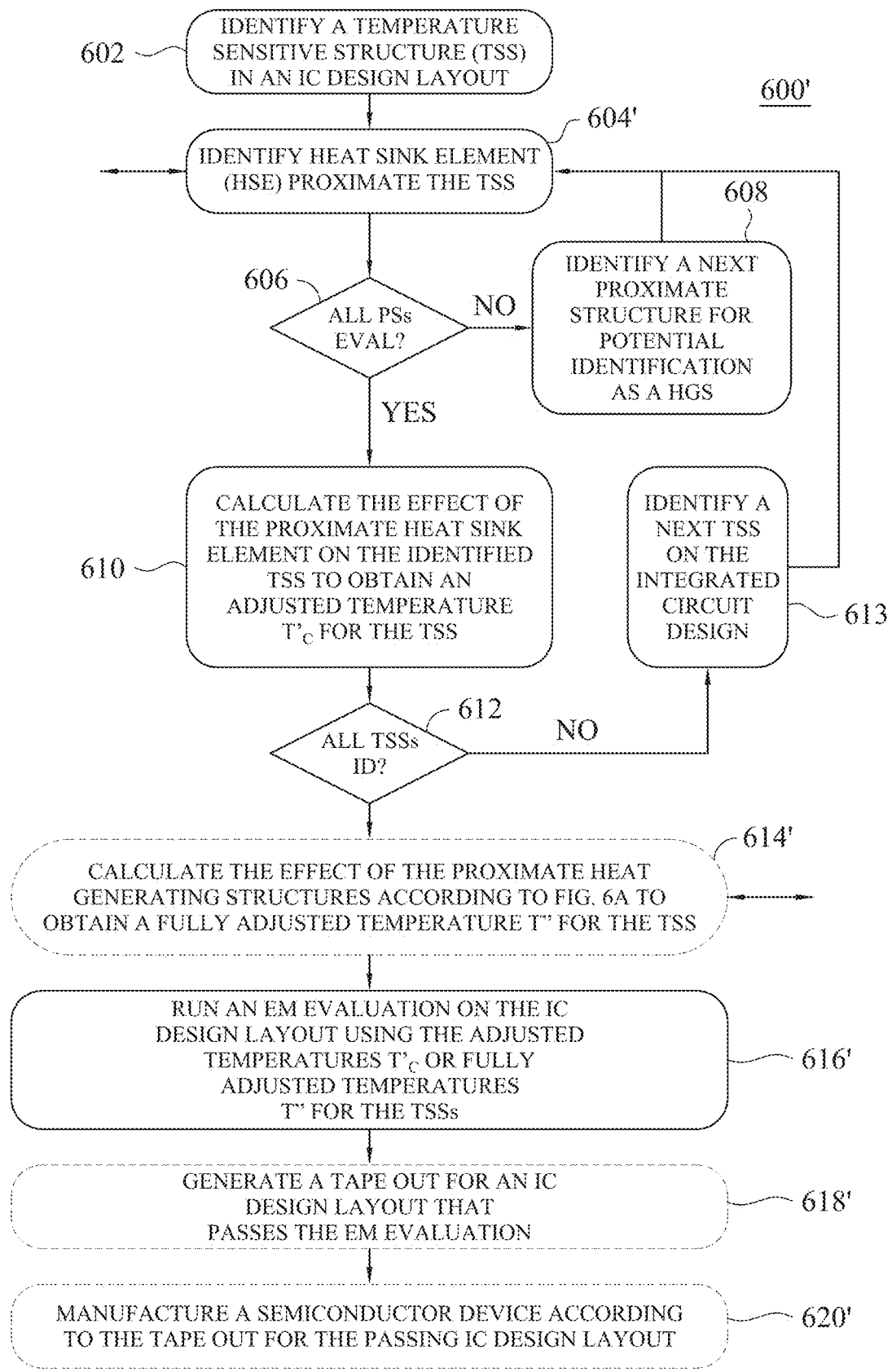

During optional operation 614, the effect of proximate heat sink elements, e.g., surrounding and/or adjacent, the temperature sensitive structure(s) is evaluated according to the method detailed in FIG. 6B, in order to provide a more precise adjusted temperature that takes into account both the heating and cooling effects of structures proximate the temperature sensitive structures. In operation 614, the proximate structures are evaluated for identification as heat sink elements (HSE). In order to be identified as a heat sink element a proximate structure will exhibit at least the properties of 1) an operating temperature that meets or exceeds a predetermined temperature difference below the anticipated operating temperature of the temperature sensitive structure and 2) a location within the impact area defined by the temperature sensitive structure (or by the heat sink element) that allows for thermal coupling between the proximate heat sink element and the temperature sensitive structure. Proximate structures having or exhibiting an operating temperature and location sufficient to meet the noted properties are then identified as heat sink elements.

In operation 616, the adjusted temperature T'H, which takes into account heating effects, or the fully adjusted temperature T", which takes into account both heating and cooling effects with regard to the temperature sensitive structure is used in running an EM evaluation to determine whether or not the integrated circuit design layout under evaluation satisfies the lifetime and performance goals for the particular design. For an integrated circuit design layout that passes the EM evaluation of operation 616, in some embodiments, a tape out data file corresponding to the passing integrated circuit design layout is generated in optional operation 618. For those integrated circuit design layouts for which a tape out data file is generated, the tape out data file will be used to manufacture a semiconductor device according to the passing integrated circuit design layout in optional operation 620.

FIG. 6B is a flowchart of a method 600' for improving the accuracy of EM evaluations conducted in connection with integrated circuit design by taking into account the temperature modulating effects of heat sink elements (HSE), i.e., elements or structures that are projected to have an operating temperature below that of proximate heat generating structures and/or the temperature sensitive structures. The consideration of the effects of heat sink structures will, in some embodiments, help compensate for thermal coupling between the heat sensitive structures and heat generating structures and/or SHE of the heat sensitive structures, thereby providing a lower and more accurate estimate of the operating temperatures of the heat sensitive structure and improving the accuracy of subsequent EM evaluations.

In embodiments of methods according to FIG. 6B, in operation 602, one or more temperature sensitive structures (TSS), e.g., transistors, conductive lines, and other structures for which an increased operating temperature will degrade performance and/or lifetime, are identified during a structural and/or operational review of an integrated circuit design layout that is under evaluation. In operation 604', structures proximate, e.g., surrounding and/or adjacent, the temperature sensitive structure are evaluated for possible identification as heat sink elements (HSE). In order to be identified as a heat sink element, a proximate structure will exhibit at least the properties of 1) an operating temperature that is below, by a predetermined temperature level, the anticipated operating temperature of the temperature sensitive structures and 2) a physical proximity that allows for thermal coupling between the proximate heat sink element and the temperature sensitive structure. Proximate structures having or exhibiting an operating temperature and location sufficient to meet the noted properties are then identified as heat sink elements.

Operation 606 involves a query regarding to the extent to which the proximate structure(s) has/have been successfully evaluated for potential identification as a heat sink elements. If fewer than all of the proximate structures have been evaluated, method 600' branches from operation 606 to operation 608 in order to identify the next proximate structure for evaluation as a heat sink element and return to operation 604' for evaluation of the next proximate structure. When all of the proximate structures have been evaluated for possible identification as heat sink elements, method 600' branches to operation 610' for calculating the ΔT contribution to the operating temperature of the temperature sensitive structure from each of the identified heat sink elements.

Operation 612 involves a query regarding to the extent to which the temperature sensitive structures within the integrated circuit design have been successfully evaluated for potential identification as a heat sink element. If fewer than all of the temperature sensitive structures on the integrated circuit design have been identified, method 600 operation branches from operation 612 to operation 613. During operation 613, the next temperature sensitive structure is identified on the integrated circuit design. The identification in operation 613 is then returned to operation 604' for identification of heat sink elements proximate the next temperature sensitive structure.

During optional operation 614' the effect of heat sink elements proximate the temperature sensitive structures is evaluated according to the method detailed in FIG. 6A, in order to provide a more realistic fully adjusted temperature that takes into account both the heating and cooling effects of structures proximate the temperature sensitive structures.

In some embodiments, in operation 616' the adjusted temperature T'$_C$, which takes into account cooling effects with regard to the temperature sensitive structure is used in running an EM evaluation to determine whether or not the integrated circuit design layout under evaluation satisfies the lifetime and performance goals for the particular design. For an integrated circuit design layout that passes the EM evaluation of operation 616', in some embodiments, a tape out data file corresponding to the passing integrated circuit design layout is generated in optional operation 618'. For those integrated circuit design layouts for which a tape out data file is generated, the tape out data file will be used to manufacture a semiconductor device according to the passing integrated circuit design layout in optional operation 620'.

Figure 6C:
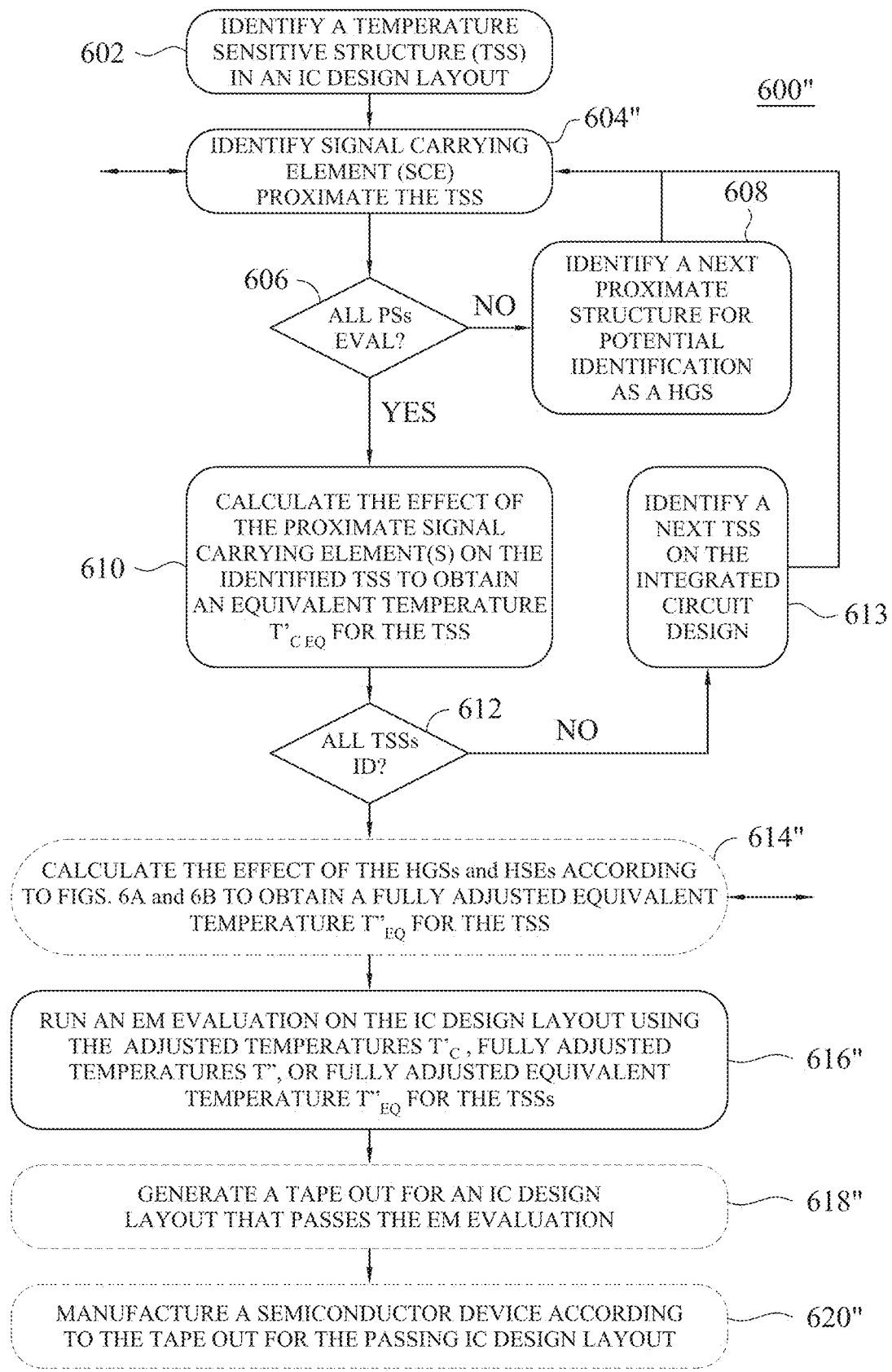

In embodiments 600" of methods according to FIG. 6C, in operation 602, one or more temperature sensitive structures (TSS), e.g., transistors, conductive lines, and other structures for which an increased operating temperature will degrade performance and/or lifetime, are identified during a structural and/or operational review of an integrated circuit design layout that is under evaluation. In operation 604", structures proximate, e.g., surrounding and/or adjacent, the temperature sensitive structures are evaluated for possible identification as signal carrying elements (SCE). In order to be identified as a signal carrying element, a proximate structure will exhibit at least the property of conducting varying levels of electrical current through the structure during functional or test operation of the semiconductor device and 2) a physical proximity that allows for thermal coupling between the proximate signal carrying element and the temperature sensitive structure. Proximate structures having or exhibiting properties sufficient to meet the noted properties are then identified as signal carrying elements.

Operation 606 involves a query regarding to the extent to which the proximate structure(s) has/have been successfully evaluated for potential identification as a signal carrying element. If fewer than all of the proximate structures have been evaluated, method 600 branches from operation 606 to operation 608 in order to identify the next proximate structure for evaluation as a signal carrying element and return to operation 604' for evaluation of the next proximate structure. When all of the proximate structures have been evaluated for possible identification as signal carrying element, method 600" branches to operation 610" for calculating the ΔT contribution to the operating temperature of the temperature sensitive structure from each of the identified signal carrying elements.

Operation 612 involves a query regarding to the extent to which the temperature sensitive structures within the integrated circuit design have been successfully evaluated for potential identification as a signal carrying element. If fewer than all of the temperature sensitive structures on the integrated circuit design have been identified, method 600" operation branches from operation 612 to operation 613. During operation 613, the next temperature sensitive structure is identified on the integrated circuit design. The identification in operation 613 is then returned to operation 604" for identification of heat elements proximate the next temperature sensitive structure.

During optional operation 614" the effect of heat generating structures and heat sink elements proximate the temperature sensitive structures is evaluated according to the methods detailed in FIGS. 6A and 6B, in order to provide a more realistic fully adjusted temperature that takes into account both the heating and cooling effects of structures proximate the temperature sensitive structures.

In some embodiments, in operation 616" the adjusted temperature T"c, which takes into signal carrying effects with regard to the temperature sensitive structure is used in running an EM evaluation to determine whether or not the integrated circuit design layout under evaluation satisfies the lifetime and performance goals for the particular design. For an integrated circuit design layout that passes the EM evaluation of operation 616", in some embodiments, a tape out data file corresponding to the passing integrated circuit design layout is generated in optional operation 618". For those integrated circuit design layouts for which a tape out data file is generated, the tape out data file will be used to manufacture a semiconductor device according to the passing integrated circuit design layout in optional operation 620".

In some embodiments, the evaluation of the proximate structures includes identification of each of the structures proximate a heat sensitive structure as a heat generating structure, a heat sink element, or a neutral structure that forms a portion a transmission path for thermal coupling between the heat sensitive structure and the other structures and/or elements. In some embodiments, the temperature effects on the heat sensitive structure of both the proximate structures identified as heat generating structures and the proximate structures identified as heat sink elements are evaluated collectively to generate a fully adjusted temperature T" that is then used in an EM evaluation.

Figure 7A:
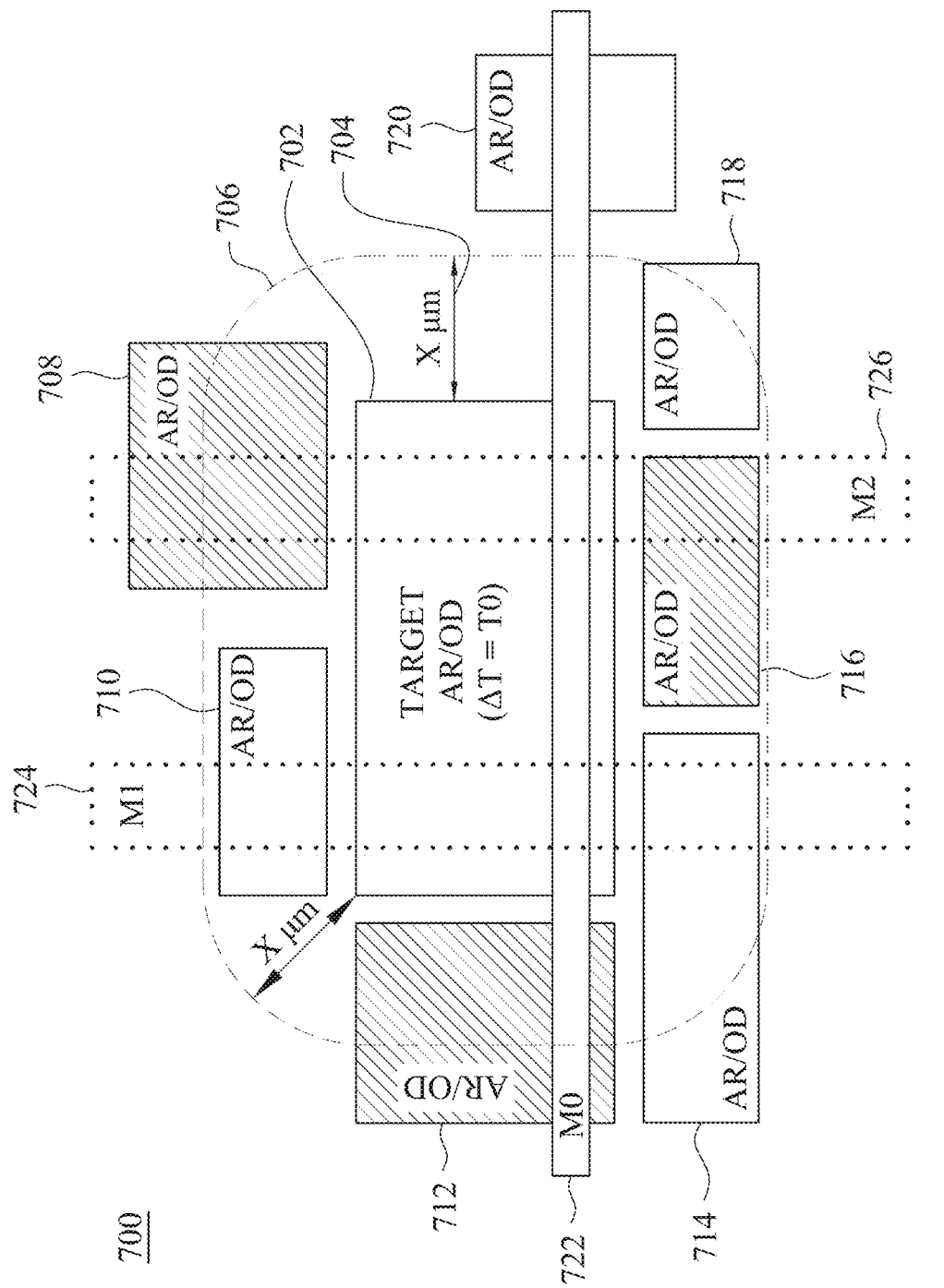
FIGS. 7A-7B are plan views showing thermal effects among components of an integrated circuit layout in accordance with some embodiments.

In some embodiments according to a portion 700 of an integrated circuit design layout in FIG. 7A, a temperature sensitive structure, e.g., a target active region 702, is associated with a number of surrounding structures including additional active regions 708, 710, 712, 714, 716, 718, and 720, as well as conductive lines including metal zero M0 722, metal one M1 724, and metal two M2 726. In some embodiments, the identification of proximate structures will be based on an impact range 704 of X μm extending horizontally from the target active region 702 to define an impact area with the impact area, in turn, being projected vertically to define an impact volume.

An impact area 706 is defined as a horizontal region within the impact range of a periphery of the target active region. This impact area 706 is projected vertically, or rotated about a longitudinal axis of the target active region, to define an impact volume. The surrounding structures that fall within, or at least partially within, this impact volume have the potential to affect the target active region and are referred to as proximate structures. In some embodiments, each of these proximate structures are then, in turn, evaluated for identification as a heat generating structure or a heat sink element relative to the target active region. In some embodiments, the temperature difference between the estimated operating temperature of target active region 702 and a proximate structure must exceed a predetermined temperature difference before the proximate structure will be identified as a heat generating structure or a heat sink element.

In FIG. 7A, the active regions 708, 712, 716 exhibit a sufficient temperature difference and are used in calculating the adjusted and/or fully adjusted operating temperature of the target active region that will be used in the subsequent EM evaluation.

In some embodiments according to FIG. 7A, Eq. 4 is used for calculating the heat sink effects of proximate active regions, i.e., those active regions surrounding the target active region, or portions thereof, that are:
- within an impact range X of the periphery of the target active region;
- thermally coupled to the target active region through one or more intervening layers or materials; and
- sufficiently "cold," i.e., have a projected operating temperature that is at least a predetermined value (° C.) or percentage below the projected operating temperature of the target active region.

$$\Delta T_{ch\_p\_FE} = f(\Delta T_{ch}, RF_{AR}, \text{Area}_{proximate\_AR}, \text{Area}_{t\_AR}, \Sigma\_AR \ldots) \quad [4]$$

Figure 7B:
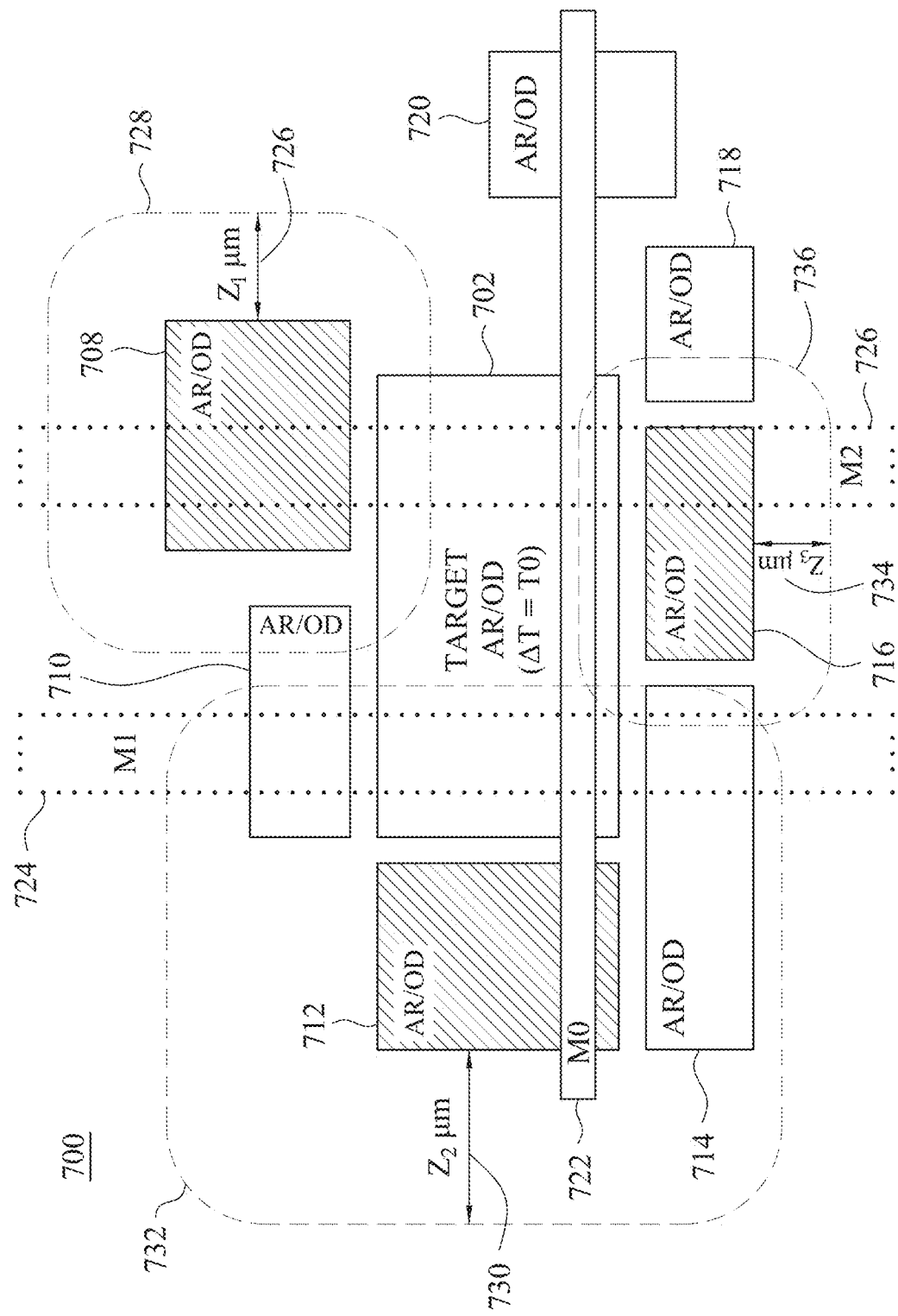

$\Delta T_{ch}$: Original active region temperature without heat sink effect $\Delta T_{ch\_p\_FE}$: active region temperature with front end (FE) heat sink(s) effects $\text{Area}_{t\_AR}$: Target active region area $\text{Area}_{proximate\_AR}$: Effective proximate connected-AR heat sink area $\Sigma\_AR$: Summation for $(RF_{AR} * \text{Area}_{proximate\_AR})$ for all proximate connected-AR $RF_{AR}$: Fitting factor for active region heat sink based on silicon results In some embodiments according to a portion 700 of an integrated circuit design layout in FIG. 7B, a temperature sensitive structure, e.g., a target active region 702, is associated with a number of surrounding structures including additional active regions 708, 710, 712, 714, 716, 718, and 720, as well as conductive lines including metal zero (M0) 722, metal one (M1) 724, and metal (M2) 726. Unlike the embodiments reflected in FIG. 7A, which focused on the target active region for defining an impact range, in some embodiments according to FIG. 7B, the identification of proximate structures is based on an impact range specific to each of the surrounding structures relative to the target active region 702. Accordingly, those proximate structures that exhibit a greater temperature difference relative to the target active region 702 (or which are separated from the target active region by more thermally conductive material(s)) have a correspondingly greater impact range than other proximate structures. As shown in FIG. 7B, active region 708 has a horizontal impact range of $Z_1$ μm 738 defining an impact area 728, active region 712 has a horizontal impact range of $Z_2$ μm 730 defining an impact area 732, and active region 716 has a horizontal impact range of $Z_3$ μm 734 defining an impact area 736.

In some embodiments according to FIG. 7B, the impact areas 728, 732, and 736 are used for identifying as proximate structures those of the surrounding structures which have a horizontal impact range that encompasses at least a portion of the target active region 702. In some embodiments, the temperature difference between the estimated operating temperature of target active region 702 and a proximate structure must exceed a predetermined level before the proximate structure will be identified as a heat generating structure or a heat sink element.

In FIG. 7B, the active regions 708, 712, 716 exhibit both a temperature difference exceeding the predetermined level and an impact area that overlaps a portion of target active region 702 and will be used in calculating the adjusted and/or fully adjusted operating temperature of the target active region that will be used in the subsequent EM evaluation.

In some embodiments according to FIG. 7B, Eq. 5 is used for calculating the heat sink effects of proximate active regions, i.e., those active region surrounding the target active region, or portions thereof, that are:
- within an impact range Z of the periphery of each proximate active region;
- thermally coupled to the target active region through one or more intervening layers or materials; and
- sufficiently "cold," i.e., have a projected operating temperature that is at least a predetermined value (° C.) or percentage below the projected operating temperature of the target active region.

$$\Delta T_{ch\_p\_FE} = f(\Delta T_{ch}, RF_{AR}, \text{Area}_{proximate\_AR}, \text{Area}_{t\_AR}, \Sigma\_AR \ldots) \quad [5]$$

$\Delta T_{ch}$: Original active region temperature without heat sink effect $\Delta T_{ch\_p\_FE}$: active region temperature with front end (FE) heat sink effect(s)

$\text{Area}_{t\_AR}$: Target active region area $\text{Area}_{proximate\_AR}$: Effective proximate connected AR heat sink area $\Sigma\_AR$: Summation for $(RF_{AR} * \text{Area}_{proximate\_AR})$ for all proximate connected-active regions $RF_{AR}$: Fitting factor for active region heat sink based on silicon results In addition to proximate active regions, a target active region will be impacted by the proximity of one or more back end (BE) or back end of line (BEOL) structures, particularly conductive lines, which exhibit greater thermal conductivity than the insulating materials surrounding and separating the target active region and proximate active region. In some embodiments, heat sink equation, Eq. 6, will be used for identifying and determining the contribution (if any) of proximate BE structures (conductive lines) to the operating temperature of the target active region. Proximate BE structures are those BE structures that are within an impact distance of the target active region and are thermally coupled to the target active region. In some embodiments, a final active region temperature will be calculated using Eq. 7, with the $\Delta T_{ch\_p}$ being a function of the initial target active region temperature (which incorporates SHE and thermal coupling to other structures), heat sink effects attributable to FE structures, and heat sink effects attributable to BE structures.

$$\Delta T_{ch\_p\_BE} = f(\Delta T_{ch}, RF_m, \text{Area}_m, \text{Area}_{t\_AR}, \Sigma\_m, \ldots) \quad [6]$$

$$\Delta T_{ch\_p} = f(\Delta T_{ch}, \Delta T_{ch\_p\_FE}, \Delta T_{ch\_p\_BE}) \quad [7]$$

$\Delta T_{ch}$: Original active region temperature without heat sink effect $\Delta T_{ch\_p}$: active region temperature with both heat sink effects $\Delta T_{ch\_p\_FE}$: active region temperature with FE heat sink effects $\Delta T_{ch\_p\_BE}$: active region temperature with BE heat sink effects $\text{Area}_{t\_AR}$: Target active region area $\text{Area}_m$: Effective metal heat sink area for metal layer (m)

$\Sigma\_m$: Summation for $(RF_m * \text{Area}_m)$ for M0~MX $RF_m$: Fitting factor for metal heat sink based on silicon results Taking SHE into consideration during an EM evaluation, for example, helps to prevent an integrated circuit design layout from being characterized as more resistant to EM effects than the corresponding semiconductor device will actually achieve in operation, thereby helping to prevent unforeseen and premature field failures of the semiconductor devices. Considering only SHE; however, produces a worst-case scenario for the evaluation. In some integrated circuit design layouts, other nearby or proximate structures will provide a heat sink functionality that will mitigate the SHE, provide a more accurate estimation of the operating temperature of temperature sensitive structures, and reduce the need for unnecessary redesign(s) to improve the thermal performance of the resulting semiconductor devices.

Accordingly, an EM signoff methodology that takes into account both SHE and heat-sink effects with regard to temperature sensitive structures and/or functions helps to improve the accuracy of the integrated circuit design layout analysis. By improving the accuracy of the integrated circuit design layout analysis, embodiments of the methods will increase the confidence that semiconductor devices manufactured according to a particular integrated circuit design layout will perform as desired and maintain satisfactory performance for over the design lifetime of the semiconductor device.

The efficiency of EM signoff methodologies considering the thermal effects of a particular integrated circuit design layout is improved by utilizing equation-based thermal evaluations, thereby avoiding slower, more time-consuming and computational resource-consuming thermal modeling. The efficiency of some embodiments of the signoff methodologies are further improved by utilizing a pseudo-three-dimensional model for evaluating thermal coupling between various components including both front end of line (FEOL) and back end of line (BEOL) structures.

In some embodiments, the BE structures, particularly the conductive lines, are a focus of the EM evaluations. In some embodiments, the EM tool used for generating a final conductive line temperature will determine the final $T_{metal}$ by factoring in both the environmental temperature $T_{env}$ (or initial temperature $T_0$) and a calculated $\Delta T_{Metal}$ according to Eq. 8. In some embodiments, the final $T_{metal}$ will then be evaluated using a temperature rating factor provided by the foundry or obtained from another source. In some embodiments, the temperature rating factor will be associated with a particular integrated circuit design layout while in other embodiments, the temperature rating factor will be associated with a particular manufacturing process that will be used to produce semiconductor devices. In general, the higher the value of the final $T_{metal}$ (or, more broadly, a nominal temperature $T_{nom}$), the lower the temperature rating factor that a particular design will receive.

$$T_{metal} = T_{env} + \Delta T_{Metal} \qquad [8]$$

In some embodiments, the EM methodologies detailed above will be applied to any integrated circuit design layout and/or semiconductor manufacturing process in which SHE are anticipated to be a factor. In some embodiments, the integrated circuit design layouts will include FinFET devices and/or other planar or more complex structural semiconductor manufacturing processes.

In some embodiments, the self-heating aware EM evaluation identifies those regions, if any, of the integrated circuit design layout in which the SHE result in localized heating, e.g., a "hotspot," that will reduce the overall EM performance and/or lifetime of semiconductor devices manufactured according to the integrated circuit design. In some embodiments, the initial self-heating aware EM evaluation is coupled with a heat sink-aware EM evaluation in order to determine if one or more surrounding structures is capable of mitigating the self-heating effects and/or thermal coupling effects previously identified and thereby improving the EM performance of the integrated circuit design layout.

In some embodiments, executing a heat sink-aware EM evaluation utilizes an electronic design automation (EDA) (also referred to as electronic computer-aided design (ECAD)) tool for identifying potential heat sink structures with in the integrated circuit design layout. In some embodiments, the EDA tool is configured to identify potential hotspots and heat sink structures from an integrated circuit design layout database (DB). Potential heat sink structures include, for example, active regions, guard rings, conductive lines, vias, and other structures that are located within a predetermined impact range of an identified hotspot or temperature sensitive structure. In some embodiments, the integrated circuit design layout DB will utilize Open Artwork System Interchange Standard (OASIS) or another language for representing the integrated circuit design layout.

In some embodiments, evaluation of potential heat sink structures will include consideration of parameters including, for example, structural dimensions, material properties, intervening materials, environmental conditions, and anticipated (calculated) operating temperatures. In some embodiments, an EDA tool is configured for calculating the total heat sink effect attributable to the identified heat sink structures and providing a temperature adjustment (reduction) for the temperature of the hotspot. In some embodiments, an EDA tool will utilize the temperature adjustment in determining the EM performance of the integrated circuit design layout.

In some embodiments, the heat sink aware EM sign-off methodology will provide more accurate local temperature calculations inside the integrated circuit design layout; more accurate thermal-aware EM evaluation results during the design phase; a reduced risk of premature product failure and/or overdesign; reduced simulation runtime using equation-based device temperature calculations; and reduced EM emulation runtime using pseudo-3D thermal models rather than full 3-D thermal modeling.

Figure 8:
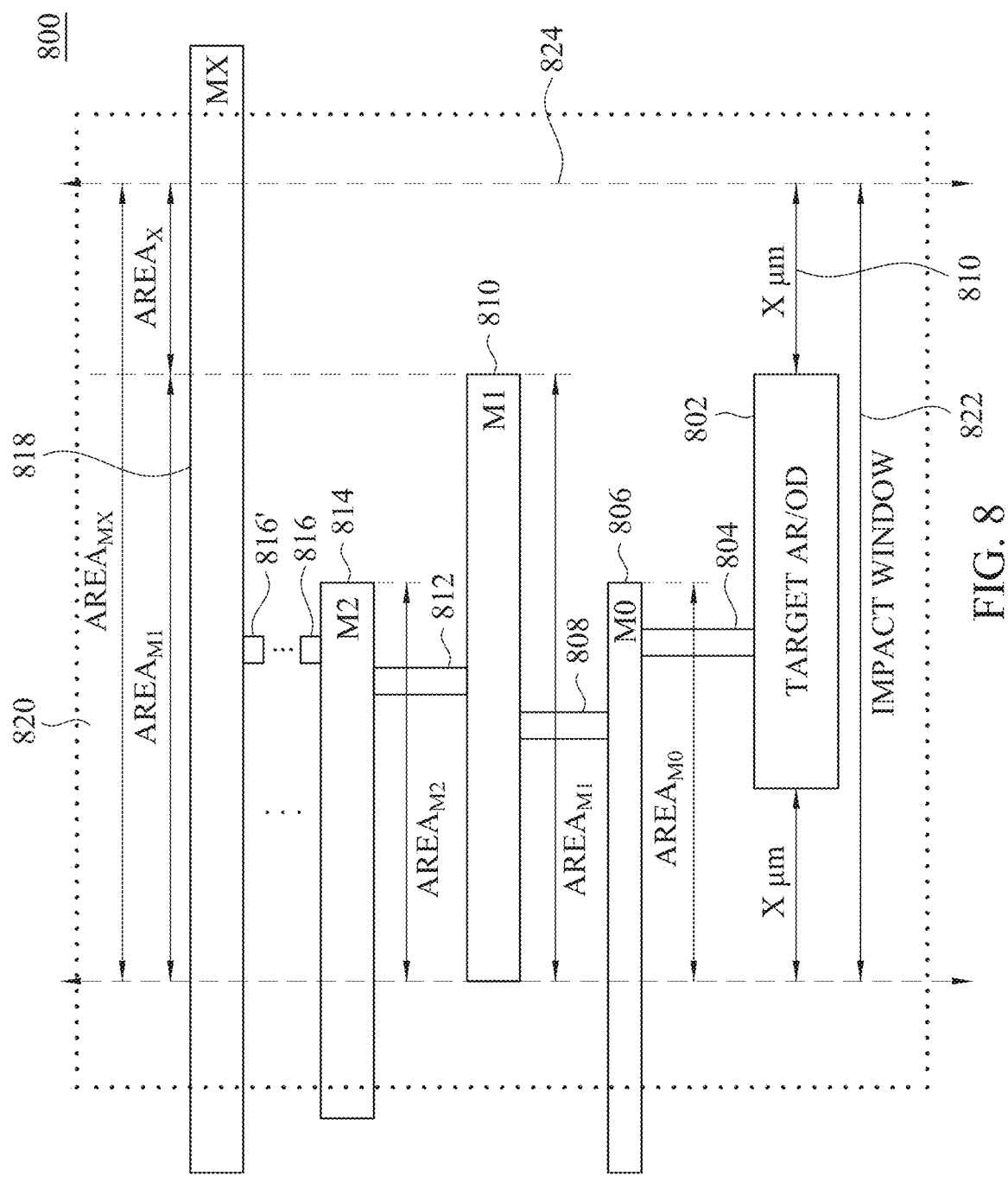
FIG. 8 is a cross-sectional view showing thermal effects and affected areas among components of an integrated circuit layout in accordance with some embodiments.

In some embodiments, BE structures, particularly conductive lines and vias, will act as heat sinks for temperature sensitive FE structures, e.g., an active region. In some embodiments according to the cross-section of a portion 800 of an integrated circuit design layout in FIG. 8, the target active region 802 has an impact range 810 and is connected to a conductive pattern M0 806 through via/contact 804. The conductive pattern M0 is, in turn, connected to conductive pattern M1 810 through via 808, conductive pattern M1 is connected to conductive pattern M2 814 through via 812. Conductive pattern M2 is connected to upper conductive patterns through via 816. Each of the conductive patterns is separated by ILD material 820. A top conductive pattern MX 818 is connected to lower conductive patterns through via 816'.

The impact range 810 will be used, in turn, to define an impact area (or impact window) 822 that incorporates the target active region and a surrounding region within X μm from the target active region 802. The impact area 822 will be used, in turn, to define an impact volume 824 the will contain at least portions of the proximate structures. In some embodiments, each of the conductive patterns 806, 810, 814, 818, will have a corresponding portion located within the impact volume 824 with the corresponding portion having a corresponding area $AREA_{M0}$, $AREA_{M1}$, $AREA_{M2}$, $AREA_{MX}$. Each of the portions of the conductive patterns that fall within an impact window defined by extending the impact range 810 from the periphery of the target active region will have a corresponding length, area, volume, and $T_{metal}$ that will determine a degree of heat sink activity with respect to the target active region.

Figure 9B:
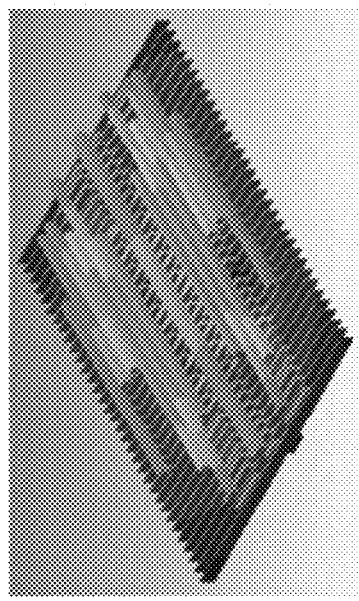
FIGS. 9A-9D are perspectives views showing thermal effects among components of configurations of an integrated circuit layout in accordance with some embodiments.
Figure 9A:
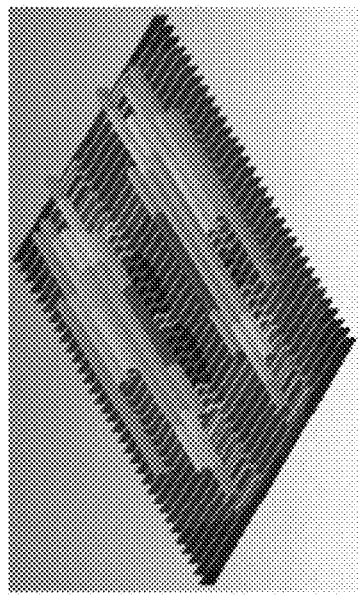
Figure 9D:
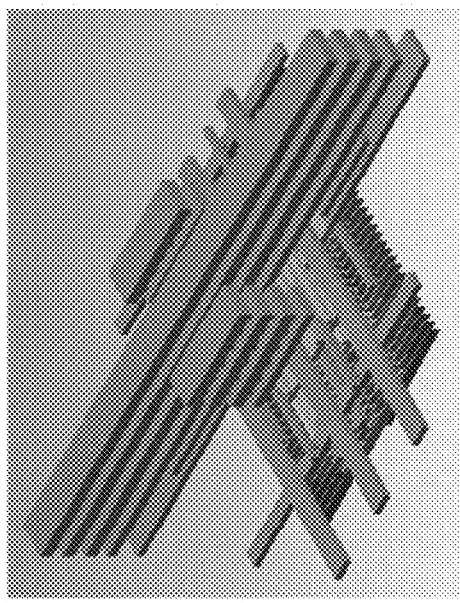
Figure 9C:
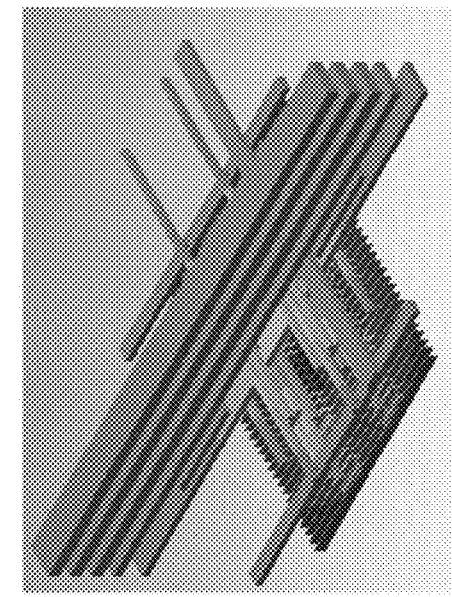

FIGS. 9A-D, are perspective views of a transformation of the results of EM evaluations conducted according to some embodiments using different techniques and/or methodologies. FIG. 9A is a base EM evaluation that does not include consideration of any heat sink impact and, as a result, exhibits a hotspot near the center of the integrated circuit design. FIG. 9B is the result of an EM evaluation that compensates for the presence of a guard ring (a front end of line (FEOL) heat sink structure) and reflects a reduction in the temperature of the hotspot found in FIG. 9A. FIG. 9C is the result of an EM evaluation that compensates for the presence of a conductive (metal) pattern above the active regions (a back end of line (BEOL) heat sink structure) and reflects a reduction in the temperature of the hotspot found in FIG. 9A. FIG. 9D is the result of an EM evaluation that compensates for both the presence of both a guard ring and conductive patterns (conductive lines) above the active regions (both FEOL and BEOL heat sink structures) and reflects an even greater reduction in the temperature of the hotspot found in FIG. 9A than the results in FIG. 9B or FIG. 9C.

Figure 10:
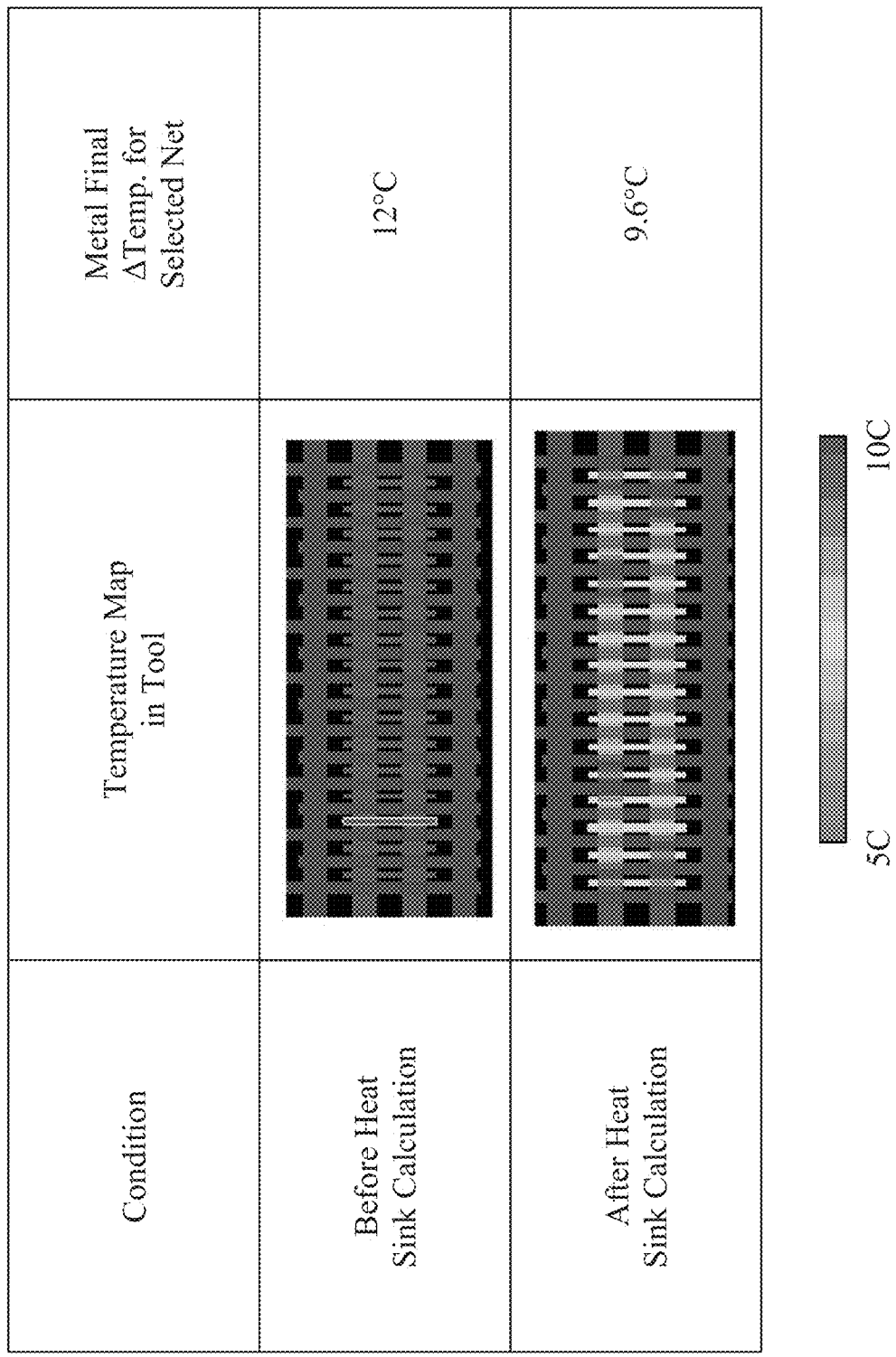
FIG. 10 is a chart illustrating the mitigating effect of including heat sink effects in an EM analysis on an integrated circuit layout in accordance with some embodiments.

FIG. 10 is a table including a transformation of the results of EM evaluations conducted according to some embodiments that include a heat sink analysis in the process of calculating a ΔT for illustrated features on a portion of an integrated circuit design layout. As reflected in FIG. 10, the heat sink structure(s) proximate the heat sensitive structure reduce the calculated ΔT of the heat sensitive structure by 2.4° C. (reduced from 12° C. to 9.6° C.) when compared to the ΔT value obtained without considering the effect(s) of the heat sink structure(s). The reduction in the ΔT will, in turn, improves the EM evaluation results for the integrated circuit design layout.

Figure 11:
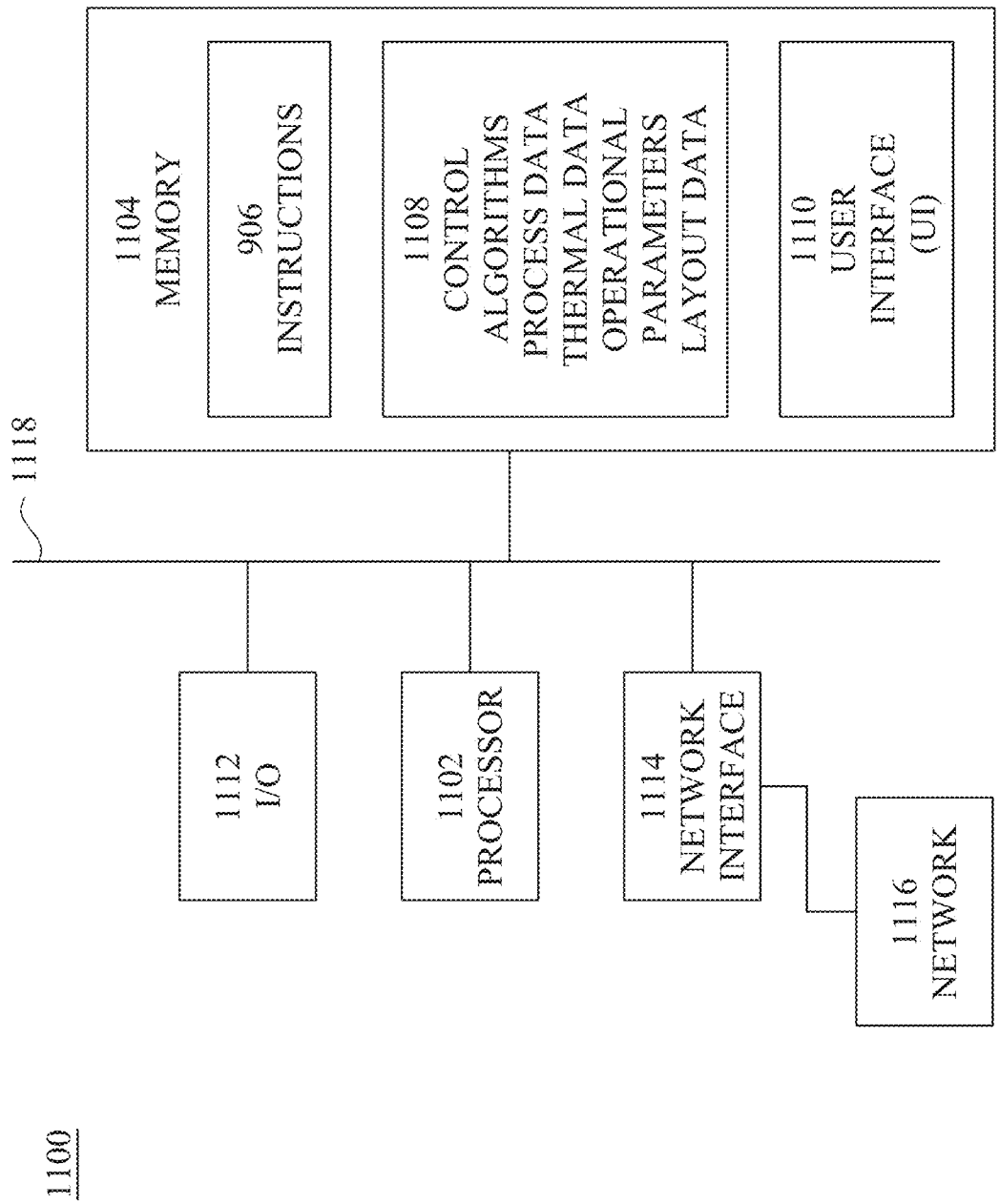
FIG. 11 is a schematic view of an electronic process control (EPC) system useful in the operation of an EM sign-off methodology in accordance with some embodiments.

FIG. 11 is a block diagram of an electronic process control (EPC) system 1100, in accordance with some embodiments. Methods described herein of generating cell layout diagrams, in accordance with one or more embodiments, are implementable, for example, using EPC system 1100, in accordance with some embodiments. In some embodiments, EPC system 1100 is a general purpose computing device including a hardware processor 1102 and a non-transitory, computer-readable storage medium 1104. Storage medium 1104, amongst other things, is encoded with, i.e., stores, computer program code (or instructions) 1106, i.e., a set of executable instructions. Execution of computer program code 1106 by hardware processor 1102 represents (at least in part) an EPC tool which implements a portion or all of, e.g., the methods described herein in accordance with one or more (hereinafter, the noted processes and/or methods).

Hardware processor 1102 is electrically coupled to computer-readable storage medium 1104 via a bus 1118. Hardware processor 1102 is also electrically coupled to an I/O interface 1112 by bus 1118. A network interface 1114 is also electrically connected to hardware processor 1102 via bus 1118. Network interface 1114 is connected to a network 1116, so that hardware processor 1102 and computer-readable storage medium 1104 are capable of connecting to external elements via network 1116. Hardware processor 1102 is configured to execute computer program code 1106 encoded in computer-readable storage medium 1104 in order to cause EPC system 1100 to be usable for performing a portion or all of the noted processes and/or methods. In one or more embodiments, hardware processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, storage medium 1104 stores computer program code 1106 configured to cause EPC system 1100 (where such execution represents (at least in part) the EPC tool) to be usable for performing a portion or all of the noted processes and/or methods. In one or more embodiments, storage medium 1104 also stores information which facilitates performing a portion or all of the noted processes and/or methods. In one or more embodiments, storage medium 1104 stores process control data 1108 including, in some embodiments, control algorithms, process variables and constants, target ranges, set points, and code for enabling statistical process control (SPC) and/or model predictive control (MPC) based control of the various processes.

EPC system 1100 includes I/O interface 1112. I/O interface 1112 is coupled to external circuitry. In one or more embodiments, I/O interface 1112 includes a keyboard, keypad, mouse, trackball, trackpad, touchscreen, and/or cursor direction keys for communicating information and commands to hardware processor 1102.

EPC system 1100 also includes network interface 1114 coupled to hardware processor 1102. Network interface 1114 allows EPC system 1100 to communicate with network 1116, to which one or more other computer systems are connected. Network interface 1114 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EPC systems 1100.

EPC system 1100 is configured to receive information through I/O interface 1112. The information received through I/O interface 1112 includes one or more of instructions, data, design rules, process performance histories, target ranges, set points, and/or other parameters for processing by hardware processor 1102. The information is transferred to hardware processor 1102 via bus 1118. EPC system 1100 is configured to receive information related to a user interface (UI) through I/O interface 1112. The information is stored in computer-readable medium 1104 as user interface (UI) 1110.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EPC tool. In some embodiments, a portion or all of the noted processes and/or methods is implemented as a software application that is used by EPC system 1100.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 12:
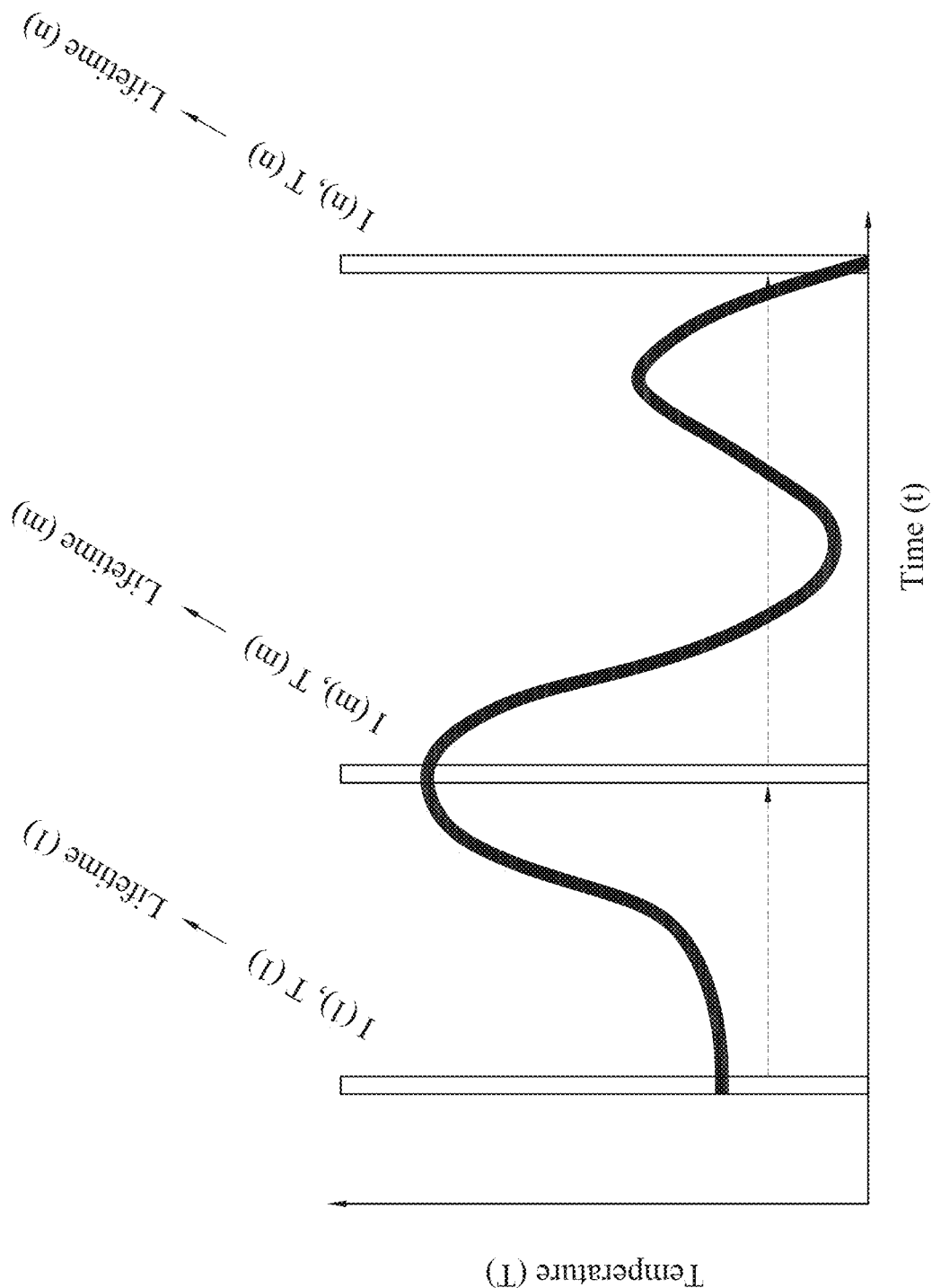
FIG. 12 is a graph showing the temperature response within a semiconductor device component in response to signal induced heating in accordance with some embodiments.
Figure 13A:
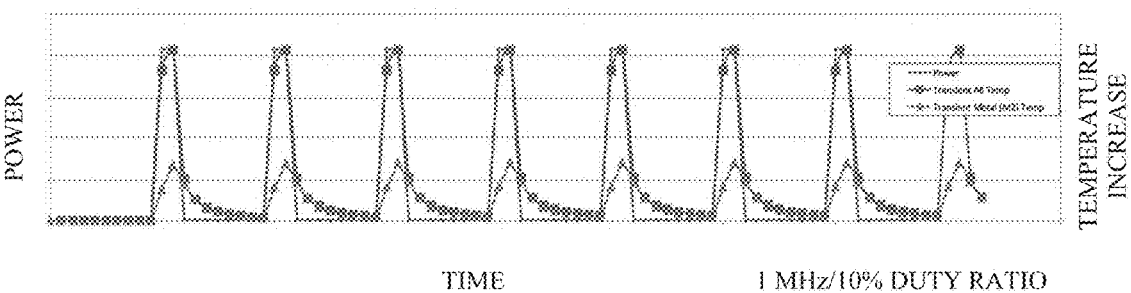
FIGS. 13A-13E are graphs showing a relationship between power applied to a semiconductor device component, an active region temperature response, and a metal conductor temperature response at different frequency and duty ratio combinations in accordance with some embodiments.
Figure 13B:
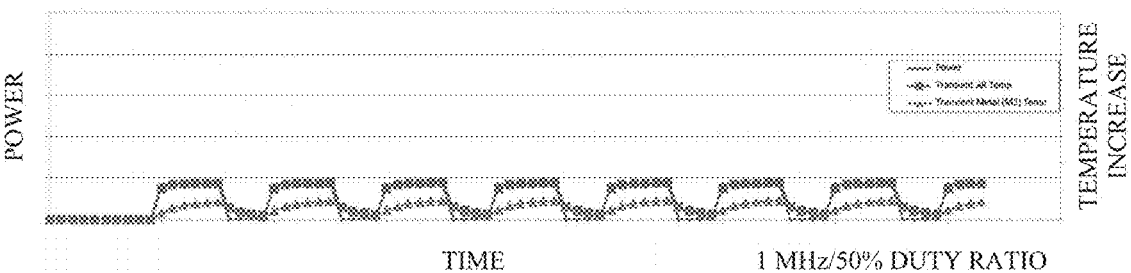
Figure 13C:
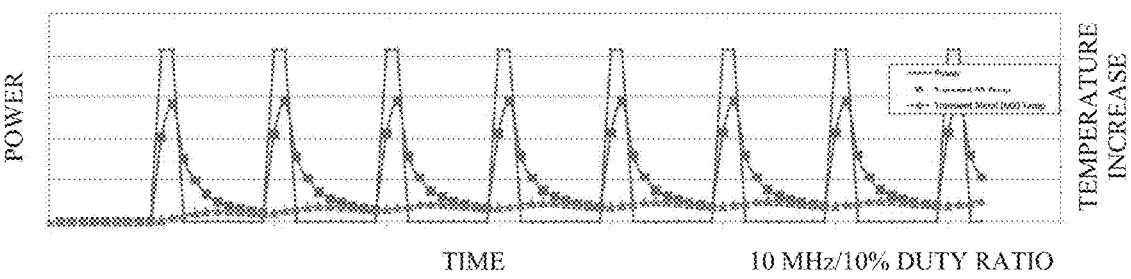
Figure 13D:
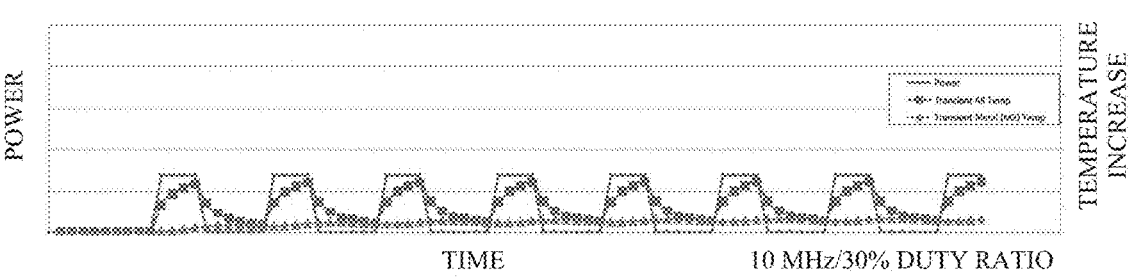
Figure 13E:
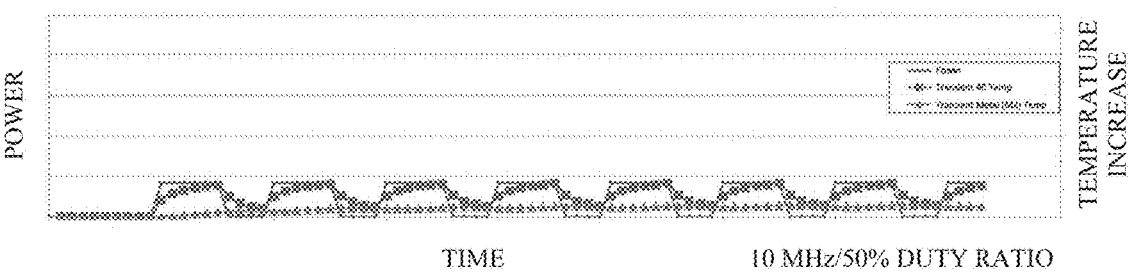

FIG. 12 illustrates a temperature response (t) induced in a semiconductor component by a series of signal pulses. Snapshots of the current (I) and temperature (T) taken at three discrete times t(1), t(m), t(n). As reflected in FIG. 12, projected semiconductor device lifetimes are a function of the magnitude and frequency of the signal applied to the device and the temperature induced by the applied signal current. Consequently, the lifetimes calculated for the three different time periods Lifetime(1), Lifetime(m), Lifetime(n), will vary accordingly with Lifetime(n)>Lifetime(1)>Lifetime(m) with the highest operating temperatures resulting in the shortest calculated lifetimes. The accuracy of the lifetime estimates will be improved by the summation of the results for a number of small time increments comprising the entire period t over which the signal is applied or by integration of a function corresponding to the temperature response of the component to the applied signal between t(0) and t(t).

FIGS. 13A-13E illustrate the relationship between signal frequency and duty ratio as applied to signal carrying elements within a semiconductor device design according to some embodiments. As reflected in FIGS. 13A-13E, lower duty ratios result in higher current density and increased heating within the signal carrying elements relative to the heating at higher duty ratios. Similarly, lower frequencies result in lower average current densities and reduced heating in the signal carrying elements relative to the heating at higher frequencies.

Figure 14:
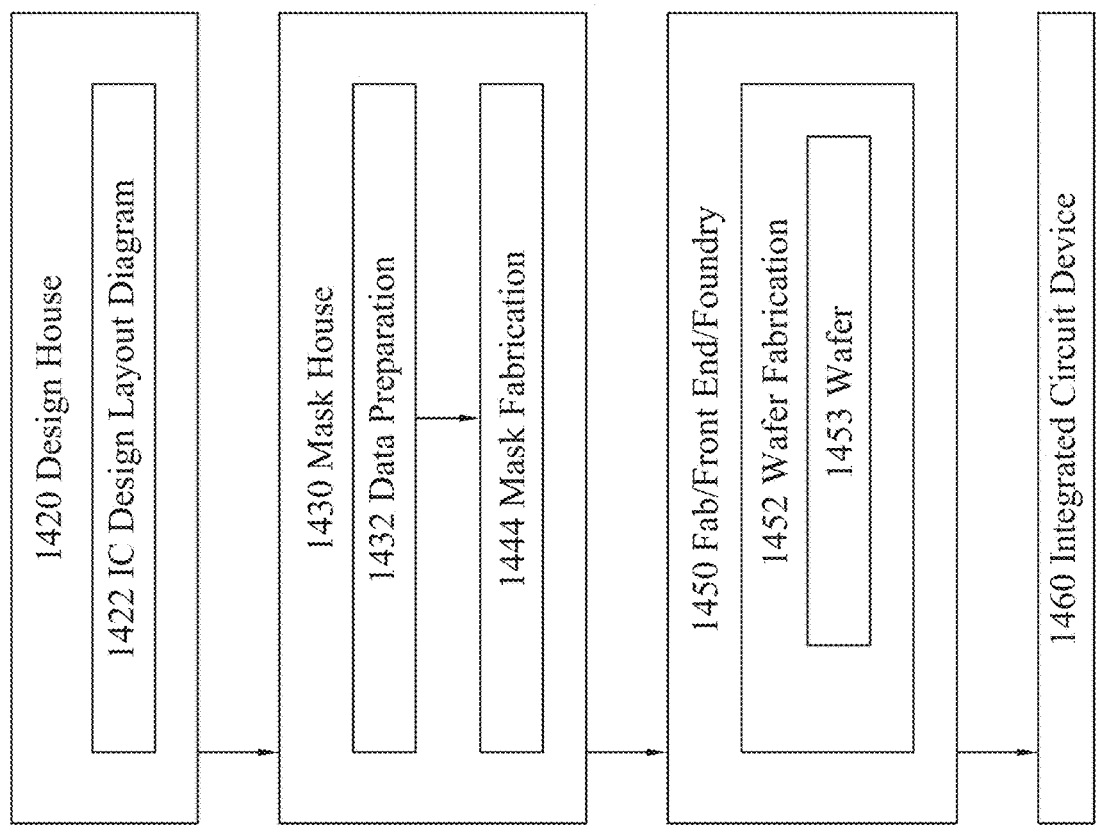
FIG. 14 is a flow diagram of a manufacturing process for an integrated circuit in accordance with some embodiments.

FIG. 14 is a block diagram of an integrated circuit (IC) manufacturing system 1400, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1400.

In FIG. 14, IC manufacturing system 1400 includes entities, such as a design house 1420, a mask house 1430, and an IC manufacturer/fabricator ("fab") 1450, that interact with one another in the design, development, and manufacturing cycles and/or services related to manufacturing an IC device 1460. The entities in system 1400 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1420, mask house 1430, and IC fab 1450 is owned by a single larger company. In some embodiments, two or more of design house 1420, mask house 1430, and IC fab 1450 coexist in a common facility and use common resources.

Design house (or design team) 1420 generates an IC design layout diagram 1422. IC design layout diagram 1422 includes various geometrical patterns designed for an IC device 1460. The geometrical patterns correspond to patterns of metal, oxide, or semiconductor layers that make up the various components of IC device 1460 to be fabricated. The various layers combine to form various IC features. For example, a portion of IC design layout diagram 1422 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1420 implements a proper design procedure to form IC design layout diagram 1422. The design procedure includes one or more of logic design, physical design or place and route. IC design layout diagram 1422 is presented in one or more data files having information of the geometrical patterns. For example, IC design layout diagram 1422 can be expressed in a GDSII file format or DFII file format.

Whereas the pattern of a modified IC design layout diagram is adjusted by a method such as Method 600, in order to reduce parasitic capacitance of the integrated circuit as compared to an unmodified IC design layout diagram, the modified IC design layout diagram reflects the results of changing positions of conductive line in the layout diagram, and, in some embodiments, inserting to the IC design layout diagram, features associated with capacitive isolation structures to further reduce parasitic capacitance, as compared to IC structures having the modified IC design layout diagram without features for forming capacitive isolation structures located therein.

Mask house 1430 includes data preparation 1432 and mask fabrication 1444. Mask house 1430 uses IC design layout diagram 1422 to manufacture one or more masks to be used for fabricating the various layers of IC device 1460 according to IC design layout diagram 1422. Mask house 1430 performs mask data preparation 1432, where IC design layout diagram 1422 is translated into a representative data file ("RDF"). Mask data preparation 1432 provides the RDF to mask fabrication 1444. Mask fabrication 1444 includes a mask writer. A mask writer converts the RDF to an image on a substrate, such as a mask (reticle) 1445 or a semiconductor wafer 1453. The design layout diagram 1422 is manipulated by mask data preparation 1432 to comply with particular characteristics of the mask writer and/or requirements of IC fab 1450. In FIG. 14, mask data preparation 1432 and mask fabrication 1444 are illustrated as separate elements. In some embodiments, mask data preparation 1432 and mask fabrication 1444 can be collectively referred to as mask data preparation.

In some embodiments, mask data preparation 1432 includes optical proximity correction (OPC) which uses lithography enhancement techniques to compensate for image errors, such as those that can arise from diffraction, interference, other process effects and the like. OPC adjusts IC design layout diagram 1422. In some embodiments, mask data preparation 1432 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1432 includes a mask rule checker (MRC) that checks the IC design layout diagram 1422 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1422 to compensate for limitations during mask fabrication 1444, which may undo part of the modifications performed by OPC in order to meet mask creation rules.

In some embodiments, mask data preparation 1432 includes lithography process checking (LPC) that simulates processing that will be implemented by IC fab 1450 to fabricate IC device 1460. LPC simulates this processing based on IC design layout diagram 1422 to create a simulated manufactured device, such as IC device 1460. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1422.

It should be understood that the above description of mask data preparation 1432 has been simplified for the purposes of clarity. In some embodiments, data preparation 1432 includes additional features such as a logic operation (LOP) to modify the IC design layout diagram 1422 according to manufacturing rules. Additionally, the processes applied to IC design layout diagram 1422 during data preparation 1432 may be executed in a variety of different orders.

After mask data preparation 1432 and during mask fabrication 1444, a mask 1445 or a group of masks 1445 are fabricated based on the modified IC design layout diagram 1422. In some embodiments, mask fabrication 1444 includes performing one or more lithographic exposures based on IC design layout diagram 1422. In some embodiments, an electron-beam (e-beam) or a mechanism of multiple e-beams is used to form a pattern on a mask (photomask or reticle) 1445 based on the modified IC design layout diagram 1422. Mask 1445 can be formed in various technologies. In some embodiments, mask 1445 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1445 includes a transparent substrate (e.g., fused quartz) and an opaque material (e.g., chromium) coated in the opaque regions of the binary mask. In another example, mask 1445 is formed using a phase shift technology. In a phase shift mask (PSM) version of mask 1445, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1444 is used in a variety of processes. For example, such a mask(s) is used in an ion implantation process to form various doped regions in semiconductor wafer 1453, in an etching process to form various etching regions in semiconductor wafer 1453, and/or in other suitable processes.

IC fab 1450 includes wafer fabrication 1452. IC fab 1450 is an IC fabrication business that includes one or more manufacturing facilities for the fabrication of a variety of different IC products. In some embodiments, IC Fab 1450 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business. In some embodiments of the present disclosure, fin dimensional adjustment includes operations associated with making an array of fins across an entirety of the fin-containing functional areas of the integrated circuit, followed by modification of fin dimensions in at least one fin-containing functional area of the integrated circuit. In some embodiments of the present disclosure, the fins of different fin-containing functional areas are formed to a final fin shape or fin dimensional profile separately, in a single fin-formation manufacturing flow for each fin-containing functional area of the IC. In some embodiments, the fin dimension adjustment occurs by forming fins in a layer of fin material, or fin substrate, by applying mask layer to a top surface of the fin material, patterning the mask layer with a pattern that corresponds to the locations of fins in one or more of the fin-containing functional areas, exposing a top surface of the fin material through the mask layer, and etching the fin material to form fins in the fin substrate. In some embodiments, the fins are formed in a single functional area of the IC with a final fin dimension, the selected fin dimension (or, fin height) as described above in operation 740.

A patterned layer of mask material formed on a semiconductor substrate is made of a mask material that includes one or more layers of photoresist, polyimide, silicon oxide, silicon nitride (e.g., $Si_3N_4$), SiON, SiC, SiOC, or combinations thereof. In some embodiments, masks include a single layer of mask material. In some embodiments, a mask includes multiple layers of mask materials.

In some embodiments, the mask material is patterned by exposure to an illumination source. In some embodiments, the illumination source is an electron beam source. In some embodiments, the illumination source is a lamp that emits light. In some embodiments, the light is ultraviolet light. In some embodiments, the light is visible light. In some embodiments, the light is infrared light. In some embodiments, the illumination source emits a combination of different (UV, visible, and/or infrared) light.

Subsequent to mask patterning operations, fins of areas not covered by the mask, or fins in open areas of the pattern, are etched to modify a fin dimension. In some embodiments, the etching is performed on a top surface of fins with fin sides that are completely covered by adjoining dielectric support material deposited between fins in a previous manufacturing step. Etching of top surfaces of fins is performed with plasma etching, or with a liquid chemical etch solution, according to some embodiments. The chemistry of the liquid chemical etch solution includes one or more of etchants such as citric acid ($C_6H_8O_7$), hydrogen peroxide ($H_2O_2$), nitric acid ($HNO_3$), sulfuric acid ($H_2SO_4$), hydrochloric acid (HCl), acetic acid ($CH_3CO_2H$), hydrofluoric acid (HF), buffered hydrofluoric acid (BHF), phosphoric acid ($H_3PO_4$), ammonium fluoride ($NH_4F$) potassium hydroxide (KOH), ethylenediamine pyrocatechol (EDP), TMAH (tetramethylammonium hydroxide), or a combination thereof. In some embodiments, etching the fins is performed by exposing an upper portion of fin material, extending above a top surface of a dielectric support medium deposited between fins and recessed below a top surface of the fin height in a prior manufacturing step, to a liquid chemical etch solution comprising one or more of the liquid chemical etchants described above. An upper portion of the fin material includes a top surface and sides of the fin material.

In some embodiments, the etching process is a dry-etch or plasma etch process. Plasma etching of a substrate material is performed using halogen-containing reactive gasses excited by an electromagnetic field to dissociate into ions. Reactive or etchant gases include $CF_4$, $SF_6$, $NF_3$, $Cl_2$, $CCl_2F_2$, $SiCl_4$, $BCl_2$, or a combination thereof, although other semiconductor-material etchant gases are also envisioned within the scope of the present disclosure. Ions are accelerated to strike exposed fin material by alternating electromagnetic fields or by fixed bias according to methods of plasma etching that are known in the art. In some embodiments, etching processes include presenting the exposed portions of fins of the functional area in an oxygen-containing atmosphere to oxidize an outer portion of the fin material, followed by a chemical trimming process such as plasma-etching or liquid chemical etching, as described above, to remove the oxidized semiconductor fin material and leave a modified fin behind. In some embodiments, fin oxidation followed by chemical trimming is performed to provide greater selectivity to the fin material and to reduce a likelihood of accidental fin material removal during a manufacturing process. In some embodiments, the exposed portions of fins of the functional area are top surfaces of the fins, the fins being embedded in a dielectric support medium covering the sides of the fins. In some embodiments, the exposed portions of the fins of the functional area are top surfaces and sides of the fins that are above a top surface of the dielectric support medium, where the top surface of the dielectric support medium has been recessed to a level below the top surface of the fins, but still covering a lower portion of the sides of the fins.

IC fab 1450 uses mask(s) 1445 fabricated by mask house 1430 to fabricate IC device 1460. Thus, IC fab 1450 at least indirectly uses IC design layout diagram 1422 to fabricate IC device 1460. In some embodiments, semiconductor wafer 1453 is fabricated by IC fab 1450 using mask(s) 1445 to form IC device 1460. In some embodiments, the IC fabrication includes performing one or more lithographic exposures based at least indirectly on IC design layout diagram 1422. Semiconductor wafer 1453 includes a silicon substrate or other proper substrate having material layers formed thereon. Semiconductor wafer 1453 further includes one or more of various doped regions, dielectric features, multi-level interconnects, and the like (formed at subsequent manufacturing steps).

Details regarding an integrated circuit (IC) manufacturing system (e.g., system 1400 of FIG. 14), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, each of which are hereby incorporated, in their entireties, by reference.

In some embodiments, conductive lines are created within the integrated circuit by depositing a layer of dielectric material on a layer of the integrated circuit having gate structures therein, followed by forming an opening in the dielectric material at the location of at least one track. In some embodiments, metallic seed material is added to exposed surfaces within the opening in the dielectric material and a layer of conductive material is added to the opening over the seed layer. In some embodiments, the layer of conductive material is added by electroplating. In some embodiments, the layer of conductive material is added by sputtering, e.g., from a metal target. In some embodiments, the layer of conductive material is added by chemical vapor deposition, including one or more of chemical vapor deposition (CVD), plasma-enhanced chemical vapor deposition (PECVD), atomic layer deposition (ALD), and the like. In some embodiments, conductive material on top of the layer of dielectric material is removed from the top of the layer of dielectric material by chemical mechanical polishing (CMP) and/or plasma etching to isolate portions of the conductive material in the openings within the layer of dielectric material.

In some embodiments, the conductive lines along various tracks of the integrated circuit layout or manufactured integrated circuit are separated from each other, by removing a length of a conductive line between two other conductive lines, and filing the volume of the removed length of conductive line with dielectric material (e.g., making a trench isolation structure between two conductive lines, wherein the trench isolation structure and the conductive lines each extend along the first direction). In some embodiments, portions of one or more adjoining conductive lines are isolated by etching through the conductive lines to form an insolation structure that extends in a second direction different from the direction in which the conductive lines extend through the layer of the integrated circuit. Active areas, or functional areas, or cells, of the integrated circuit, are separated from each other or other elements of the integrated circuit by the trench isolation structure between portions of conductive lines in a region of the integrated circuit. In some embodiments, the conductive lines of the integrated circuit extend perpendicular to gate electrodes and the voltage-carrying lines [$V_{DD}$ (drain voltage), $V_{SS}$ (source voltage)] of the cell of the integrated circuit. In some embodiments, the conductive lines of the integrated circuit extend parallel to the voltage-carrying lines [$V_{DD}$ (drain voltage), and $V_{SS}$ (source voltage)] of the integrated circuit, and parallel to the gate electrodes of the cell of the integrated circuit [see, e.g., FIG. 3A, functional areas 302A and 302B].

Embodiments include methods for evaluating a heat sensitive structure involving identifying a heat sensitive structure in an integrated circuit design layout, the heat sensitive structure having a nominal temperature $T_{nom}$; identifying a first heat generating structure within a thermal coupling range of the heat sensitive structure; calculating an operating temperature $T_{oph1}$ of the first heat generating structure; calculating a temperature increase $\Delta T_{h1}$ for the heat sensitive structure induced by thermal coupling to the heat generating structure at the operating temperature $T_{oph1}$; performing an electromigration (EM) analysis of the heat sensitive structure at an evaluation temperature $T_E = T_{nom} + \Delta T_h$, and generating a tape out for passing integrated circuit device layouts for the manufacture of integrated circuit devices corresponding to the passing layout.

Other embodiments of the method include identifying additional heat generating structures that are within a thermal coupling range of the heat sensitive structure; calculating an operating temperature $T_{ophn}$ for each additional heat generating structure; calculating a $\Delta T_{h2}$ for the heat sensitive structure induced by thermal coupling to the additional heat generating structure(s) at the operating temperature $T_{ophn}$; and evaluating the heat sensitive structure at the evaluation temperature $T_E = T_{nom} + \Delta T_{h1} + \Delta T_{h2}$.

In some embodiments, the heat sensitive structure comprises a conductive line, the first heat generating structure is a fin field effect transistor (FinFET) structure and the second heat generating structure is a high-resistance (Hi-R) structure. In some embodiments the second heat generating structure comprises a non-metallic element.

The method according to some embodiments also includes identifying a first heat sink element within a thermal coupling range of the heat sensitive structure; calculating an operating temperature $T_{opc1}$ for the first heat sink element; calculating a $\Delta T_{c1}$ for the heat sensitive structure induced by thermal coupling to the first heat sink element at the operating temperature $T_{opc1}$; and evaluating the heat sensitive structure at the evaluation temperature $T_E = T_{nom} + \Delta T_{h1} + \Delta T_{h2} + \Delta T_{c1}$.

Some embodiments include verifying that the evaluation of the heat sensitive structure indicates that the semiconductor device design meets electromigration design specifications and manufacturing a semiconductor device using the verified design.

Embodiments include methods for evaluating a heat sensitive structure involving identifying a heat sensitive structure; calculating a nominal temperature $T_{nom}$ of the heat sensitive structure; identifying a first heat dissipating structure within a first thermal coupling range of the heat sensitive structure; calculating an operating temperature $T_{opc1}$ of the heat dissipating structure; calculating a $\Delta T_{c1}$ for the heat sensitive structure induced by thermal coupling with the $T_{opc1}$ of the heat dissipating structure; and conducting an electromigration (EM) performance evaluation of the heat sensitive structure at an evaluation temperature $T_E = T_{nom} + \Delta T_{c1}$.

Some embodiments include identifying additional heat dissipating structures within a second thermal coupling range of the heat sensitive structure; calculating an operating temperature $T_{open}$ for each additional heat dissipating structure; calculating a $\Delta T_{c2}$ for the heat sensitive structure induced by thermal coupling to the additional heat dissipating structure(s) at the operating temperature $T_{open}$; and conducting an electromigration evaluation of the heat sensitive structure at the evaluation temperature $T_E = T_{nom} + \Delta_{c1} + \Delta T_{c2}$.

In some embodiments the heat sensitive structure is a FinFET device and the first thermal coupling range and the second thermal coupling range are different. In some embodiments calculating the nominal temperature $T_{nom}$ comprises an analysis of self-heating effect $\Delta T$ for the heat sensitive structure and environmental temperature conditions $T_{env}$, with $T_{nom}=T_{env}+\Delta T$.

In some embodiments the heat dissipating structures are active region(s) and/or a portion(s) of at least one electrically conductive pattern. Some embodiments include retrieving design data corresponding to the integrated circuit design from a database of integrated circuit designs and then analyzing the retrieved design data to identify the heat sensitive structure(s), the heat generating structure(s), and the heat dissipating structure(s). Some embodiments include identifying at least two conductive layers in the integrated circuit design and retrieving at least two thermal coefficients associated with each of the conductive layers, the thermal coefficients including, for example, a de-rating coefficient, a layer effect coefficient, and a temperature profile.

Embodiments include methods for evaluating a heat sensitive structure involving identifying a heat sensitive structure having a nominal temperature $T_{nom}$; identifying a first heat generating structure within a first thermal coupling range of the heat sensitive structure; calculating an operating temperature Too, of the heat generating structure; calculating a $\Delta T_h$ for the heat sensitive structure induced by thermal coupling with the heat generating structure; identifying a heat dissipating structure within a second thermal coupling range of the heat sensitive structure; calculating an operating temperature $T_{opc}$ of the heat dissipating structure; calculating a $\Delta T_c$ for the heat sensitive structure induced by thermal coupling with the heat dissipating structure; and conducting an electromigration (EM) evaluation of the heat sensitive structure at an adjusted temperature $T_E=T_{nom}+\Delta T_h+\Delta T_c$. Other embodiments include determining whether the integrated circuit design passes the electromigration analysis and generating a new tape out file sufficient to guide the manufacture of a semiconductor device according to the passing integrated circuit design.

Some embodiments include a system for evaluating a heat sensitive structure of an integrated circuit design comprising a memory configured for maintaining integrated circuit design layout data, thermal data, process data, and operational parameters corresponding to the integrated circuit design; a processor configured for accessing the memory and analyzing the integrated circuit design layout data to identify a heat sensitive structure having a nominal temperature $T_{nom}$; a first heat generating structure within a first thermal coupling range of the heat sensitive structure; and a heat dissipating structure within a second thermal coupling range of the heat sensitive structure; the processor also being configured for calculating $\Delta T_h$ for the heat sensitive structure induced by thermal coupling with the heat generating structure; calculating a $\Delta T_c$ for the heat sensitive structure induced by thermal coupling with the heat dissipating structure; and conducting an electromigration (EM) evaluation of the heat sensitive structure at an adjusted temperature $T_E=T_{nom}+\Delta T_h+\Delta T_c$; and including a network interface configured for transmitting the results of the EM evaluation for a design review. Other embodiments include systems capable of compensating for variations in the layout data, thermal data, process data, and/or operational parameters corresponding to different process and metallization levels within the integrated circuit design and/or manufacturing process including those in which the first thermal coupling range and the second thermal coupling range are not identical. Other embodiments include systems in which the processor is configured for determining whether the integrated circuit design layout passes the EM analysis and generating a new tape out file for manufacture of a semiconductor device according to the integrated circuit design in response to the integrated circuit design layout passing the EM analysis.

According to some embodiments, systems for evaluating heat sensitive structures within an integrated circuit design include a memory configured for maintaining integrated circuit design layout data, thermal data, process data, and operational parameters corresponding to the integrated circuit design; a processor configured for accessing the memory and analyzing the integrated circuit design layout data to identify, for example, a heat sensitive structure having a nominal temperature $T_{nom}$, a first heat generating structure within a first thermal coupling range of the heat sensitive structure, and a first heat dissipating structure within a second thermal coupling range of the heat sensitive structure, calculating a $\Delta T_{h1}$ for the heat sensitive structure induced by thermal coupling with the first heat generating structure, calculating a $\Delta T_{c1}$ for the heat sensitive structure induced by thermal coupling with the first heat dissipating structure, and conducting an electromigration (EM) evaluation of the heat sensitive structure at an adjusted evaluation temperature $T_E=T_{nom}+\Delta T_{h1}+\Delta T_{c1}$; and a network interface configured for transmitting a result of the EM evaluation for a design review.

According to some embodiments, systems for evaluating heat sensitive structures within an integrated circuit design also include one or more additional structures and/or functions for evaluations in which, for example, the first thermal coupling range and the second thermal coupling range are different, a processor is further configured for determining whether the integrated circuit design layout passes the EM evaluation, and/or generating a new tape out file for manufacture of a semiconductor device according to the integrated circuit design in response to the integrated circuit design layout passing the EM analysis/evaluation. According to some embodiments, such systems also include additional structures and/or functions in which, for example, the heat sensitive structure comprises a conductive line, heat generating structures include a fin field effect transistor (FinFET) structure, a high-resistance (Hi-R) structure, and/or a first signal carrying structure. In yet other embodiments, such systems also include additional structures and/or functions including, for example, a processor configured for calculating an operating temperature $T_{oph1}$ of the first heat generating structure as a function of a signal pattern applied to the first heat generating structure over a time period t, identifying a first heat sink element within a third thermal coupling range of the heat sensitive structure, calculating an operating temperature $T_{opc1}$ for the first heat sink element, calculating a $\Delta T_{c1}$ for the heat sensitive structure induced by thermal coupling to the first heat sink element at the operating temperature $T_{opc1}$; and/or evaluating the heat sensitive structure at a further adjusted evaluation temperature $T_E=T_{nom}+\Delta T_{h1}+\Delta T_{h2}+\Delta T_{c1}$.

According to some embodiments, systems for evaluating heat sensitive structures within an integrated circuit design include a memory configured for maintaining integrated circuit design layout data, thermal data, process data, and operational parameters corresponding to the integrated circuit design, a processor configured for accessing the memory and analyzing the integrated circuit design layout data to identify a heat sensitive structure having a nominal temperature $T_{nom}$, a first signal carrying structure within a first thermal coupling range of the heat sensitive structure, a second signal carrying structure within a second thermal coupling range of the heat sensitive structure, calculating a $\Delta T_{h1}$ for the heat sensitive structure induced by thermal coupling with the first signal carrying structure, calculating $\Delta T_{h2}$ for the heat sensitive structure induced by thermal coupling with the second signal carrying structure, and/or conducting an electromigration (EM) evaluation of the heat sensitive structure at an adjusted evaluation temperature $T_E = T_{nom} + \Delta T_{h1} + \Delta T_{h2}$. According to some embodiments, systems for evaluating heat sensitive structures within an integrated circuit design also include one or more additional structures and/or functions for evaluations in which, for example, the processor is configured for calculating an operating temperature $T_{oph1}$ of the first signal carrying structure as a function of a waveform, a frequency, and a duty cycle of an electrical signal applied to the first signal carrying structure over a time period t, and for calculating an operating temperature $T_{oph2}$ of the second signal carrying structure as a function of a waveform, a frequency, and a duty cycle of an electrical signal applied to the second signal carrying structure over the time period t. According to some embodiments, systems for evaluating heat sensitive structures within an integrated circuit design also include one or more additional structures and/or functions for evaluations in which, for example, a processor is utilized in identifying a first heat sink element within a third thermal coupling range of the heat sensitive structure, calculating an operating temperature $T_{opc1}$ for the first heat sink element, calculating a $\Delta T_{c1}$ for the heat sensitive structure induced by thermal coupling to the first heat sink element at the operating temperature $T_{opc1}$, and/or evaluating the heat sensitive structure at a further adjusted evaluation temperature $T_E = T_{nom} + \Delta T_{h1} + \Delta T_{h2} + \Delta T_{c1}$ and a network interface configured for transmitting a result of the EM evaluation for a design review.

According to some embodiments, systems for evaluating heat sensitive structures within an integrated circuit design include a memory configured for maintaining integrated circuit design layout data, thermal data, process data, and operational parameters corresponding to the integrated circuit design, a processor configured for accessing the memory and analyzing the integrated circuit design layout data to identify a heat sensitive structure having a nominal temperature $T_{nom}$, a first heat sink element within a first thermal coupling range of the heat sensitive structure, a second heat sink element within a second thermal coupling range of the heat sensitive structure, wherein the first and second thermal coupling ranges are different, calculating a $\Delta T_{c1}$ for the heat sensitive structure induced by thermal coupling with the first heat sink element, calculating a $\Delta T_{c2}$ for the heat sensitive structure induced by thermal coupling with the second heat sink element, and/or conducting an electromigration (EM) evaluation of the heat sensitive structure at an adjusted temperature $T_E = T_{nom} + \Delta T_{c1} + \Delta T_{c2}$.

According to some embodiments, systems for evaluating heat sensitive structures within an integrated circuit design also include one or more additional structures and/or functions the processor is further configured for calculating the nominal temperature $T_{nom}$ by analyzing a self-heating effect $\Delta T$ for the heat sensitive structure and an environmental temperature condition $T_{env}$, with $T_{nom} = T_{env} + \Delta T$, identifying a first heat generating element within a third thermal coupling range of the heat sensitive structure, calculating an operating temperature $T_{oph1}$ for the first heat generating element, calculating a $\Delta T_{h1}$ for the heat sensitive structure induced by thermal coupling to the first heat sink element at the operating temperature $T_{oph1}$; and evaluating the heat sensitive structure at the evaluation temperature $T_E = T_{nom} + \Delta T_{c1} + \Delta T_{c2} + \Delta T_{h1}$.

According to some embodiments, systems for evaluating heat sensitive structures within an integrated circuit design also include one or more additional structures and/or functions that are applied against integrated circuit designs that contain, for example, conductive lines that comprise a heat sensitive structure, heat generating element that are fin field effect transistors (FinFETs) and/or a network interface configured for transmitting a result of the EM evaluation for a design review.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A system for evaluating a heat sensitive structure of an integrated circuit design comprising:
   a memory configured for maintaining data corresponding to an integrated circuit design layout, thermal data, process data, and operational parameters corresponding to the integrated circuit design;
   a processor configured for accessing the memory, wherein the processor is configured to:
   identify a target region having a nominal temperature $T_{nom}$;
   identify a first heat generating structure within a first impact range of the target region; and
   identify a second heat generating structure within the first impact range of the target region;
   calculate a $\Delta T_{h1}$ for the target region induced by thermal coupling with the first heat generating structure;
   calculate a $\Delta T_{h2}$ for the target region induced by thermal coupling with the second heat generating structure; and
   conduct a parametric evaluation of the target region at an adjusted evaluation temperature $T_E = T_{nom} + \Delta T_{h1} + \Delta T_{h2}$; and
   generate instructions for reporting a result of the parametric evaluation.

2. The system according to claim 1,
   wherein the first impact range extends from a periphery of the target region.

3. The system according to claim 1, wherein:
   the processor is further configured for determining whether the integrated circuit design layout passes the parametric evaluation; and
   generating a new tape out file for manufacture of a semiconductor device according to the integrated circuit design layout in response to the integrated circuit design layout passing the parametric evaluation.

4. The system according to claim 1, wherein:
   the target region comprises a first active region.

5. The system according to claim 1, wherein:
   the first heat generating structure is a second active region.

6. The system according to claim 5, wherein:
   the second heat generating structure comprises a third active region.

7. The system according to claim 1, wherein:
the first heat generating structure is a first signal carrying structure.

8. The system according to claim 7, wherein:
the processor is further configured for calculating an operating temperature $T_{oph1}$ of the first heat generating structure as a function of a signal pattern applied to the first heat generating structure over a time period t.

9. The system according to claim 1, wherein:
the processor is further configured for:
identifying a first heat dissipating structure within the first impact range of the target region;
calculating a $\Delta T_{c1}$ for the heat sensitive structure induced by thermal coupling to the first heat dissipating structure; and
evaluating the target region at a further adjusted evaluation temperature $T_E=T_{nom}+\Delta T_{h1}+\Delta T_{h2}+\Delta T_{c1}$.

10. A system for evaluating a target region of an integrated circuit design comprising:
a memory configured for maintaining integrated circuit design layout data, thermal data, process data, and operational parameters corresponding to the integrated circuit design;
a processor configured for accessing the memory, wherein the processor is configured to:
identify a target region having a nominal temperature $T_{nom}$;
identify a first signal carrying structure within a first impact range of the target region;
identify a second signal carrying structure within the first impact range of the target region;
calculate a $\Delta T_{h1}$ for the target region induced by thermal coupling with the first signal carrying structure;
calculate a $\Delta T_{h2}$ for the target region induced by thermal coupling with the second signal carrying structure; and
conduct an electromigration (EM) evaluation of the target region at an adjusted evaluation temperature $T_E=T_{nom}+\Delta T_{h1}+\Delta T_{h2}$.

11. The system according to claim 10, wherein:
the processor is further configured for calculating an operating temperature $T_{oph1}$ of the first signal carrying structure as a function of a waveform, a frequency, and a duty cycle of an electrical signal applied to the first signal carrying structure over a time period t.

12. The system according to claim 11, wherein:
the processor is further configured for calculating an operating temperature $T_{oph2}$ of the second signal carrying structure as a function of a waveform, a frequency, and a duty cycle of an electrical signal applied to the second signal carrying structure over the time period t.

13. The system according to claim 10, wherein:
the processor is further configured for identifying a first heat dissipating structure within the first impact range of the target region;
calculating an operating temperature $T_{opc1}$ for the first heat dissipating structure;
calculating a $\Delta T_{c1}$ for the target region induced by thermal coupling to the first heat dissipating structure at the operating temperature $T_{opc1}$; and
evaluating the target region at a further adjusted evaluation temperature $T_E=T_{nom}+\Delta T_{h1}+\Delta T_{h2}+\Delta T_{c1}$.

14. The system according to claim 10, further comprising:
a network interface configured for transmitting a result of the EM evaluation for a design review.

15. A system for evaluating a target region of an integrated circuit design comprising:
a memory configured for maintaining integrated circuit design layout data, thermal data, process data, and operational parameters corresponding to the integrated circuit design;
a processor configured for accessing the memory, wherein the processor is configured to:
identify a target region having a nominal temperature $T_{nom}$;
identify a first heat generating structure within a first impact range encompassing a first portion of the target region;
identify a second heat generating structure within a second impact range encompassing a second portion of the target region, wherein the first and second impact ranges are different;
the processor being further configured for
calculate a $\Delta T_{h1}$ for the target region induced by thermal coupling with the first heat generating structure;
calculate a $\Delta T_{h2}$ for the target region induced by thermal coupling with the second heat generating structure; and
conduct an electromigration (EM) evaluation of the target region at an adjusted temperature $T_E=T_{nom}+\Delta T_{h1}+\Delta T_{h2}$.

16. The system according to claim 15, wherein:
the processor is further configured for calculating the nominal temperature $T_{nom}$ by analyzing a self-heating effect $\Delta T$ for the target region and an environmental temperature condition $T_{env}$, with $T_{nom}=T_{env}+\Delta T$.

17. The system according to claim 15, wherein:
the processor is further configured for identifying a first heat dissipating structure within a third impact range of the target region;
calculating an operating temperature $T_{opc1}$ for the first heat dissipating structure;
calculating a $\Delta T_{c1}$ for the target region induced by thermal coupling to the first heat dissipating structure at the operating temperature $T_{oph1}$; and
evaluating the target region at an evaluation temperature $T_E=T_{nom}+\Delta T_{h1}+\Delta T_{h2}+\Delta T_{c1}$.

18. The system according to claim 15, wherein:
the target region comprises a conductive line.

19. The system according to claim 17, wherein:
the target region is an active region.

20. The system according to claim 15, further comprising:
a network interface configured for transmitting a result of the EM evaluation for a design review.

* * * * *